(12) United States Patent
Luff et al.

(10) Patent No.: US 11,624,810 B2
(45) Date of Patent: Apr. 11, 2023

(54) LIDAR SYSTEM WITH REDUCED SPECKLE SENSITIVITY

(71) Applicant: SiLC Technologies, Inc., Monrovia, CA (US)

(72) Inventors: Bradley Jonathan Luff, La Canada Flintridge, CA (US); Dazeng Feng, El Monte, CA (US); Mehdi Asghari, La Canada Flintridge, CA (US)

(73) Assignee: SiLC Technologies, Inc., Monrovia, CA (US)

( * ) Notice: Subject to any disclaimer, the term of this patent is extended or adjusted under 35 U.S.C. 154(b) by 514 days.

(21) Appl. No.: 16/780,871

(22) Filed: Feb. 3, 2020

(65) Prior Publication Data
US 2020/0256956 A1     Aug. 13, 2020

Related U.S. Application Data

(60) Provisional application No. 62/803,459, filed on Feb. 9, 2019.

(51) Int. Cl.
*G01S 7/484* (2006.01)
*G01S 7/499* (2006.01)
*G01S 17/00* (2020.01)

(52) U.S. Cl.
CPC .............. *G01S 7/484* (2013.01); *G01S 7/499* (2013.01); *G01S 17/006* (2013.01)

(58) Field of Classification Search
CPC ........ G01S 7/484; G01S 17/006; G01S 7/499; G01S 17/32; G01S 17/58; G01S 7/4815; G01S 17/42
USPC ...................................................... 356/4.01
See application file for complete search history.

(56) References Cited

U.S. PATENT DOCUMENTS

| | | | |
|---|---|---|---|
| 9,157,790 B2 | 10/2015 | Shpunt et al. | |
| 11,378,691 B2 | 7/2022 | Boloorian et al. | |
| 11,536,805 B2 | 12/2022 | Asghari et al. | |
| 2007/0103362 A1 | 5/2007 | Arikan et al. | |
| 2012/0081786 A1 | 4/2012 | Mizuyama et al. | |
| 2012/0182544 A1 | 7/2012 | Asahara et al. | |
| 2013/0051655 A1 | 2/2013 | Collard et al. | |
| 2013/0321791 A1 | 12/2013 | Feldkhun et al. | |
| 2014/0035776 A1 | 2/2014 | Sochen et al. | |
| 2016/0377721 A1 | 12/2016 | Lardin et al. | |
| 2017/0146639 A1 | 5/2017 | Carothers | |

(Continued)

FOREIGN PATENT DOCUMENTS

| | | |
|---|---|---|
| JP | 5975203 B2 | 8/2016 |
| JP | 2017-198514 A | 11/2017 |
| WO | 2018-036946 A1 | 3/2018 |

OTHER PUBLICATIONS

Thomas, Shane, International Search Report and Written Opinion, PCT/US2020/016455, U.S. Patent and Trademark Office, dated Jul. 23, 2020.

(Continued)

*Primary Examiner* — Daniel L Murphy
(74) *Attorney, Agent, or Firm* — Gavrilovich, Dodd & Lindsey LLP

(57) ABSTRACT

Multiple LIDAR output signals are generated and are concurrently directed to the same sample region in a field of view. The LIDAR output signals have one or more optical diversities selected from a group consisting of wavelength diversity, polarization diversity, and diversity of an angle of incidence of the LIDAR output signal relative to the sample region.

20 Claims, 11 Drawing Sheets

(56) References Cited

U.S. PATENT DOCUMENTS

| | | |
|---|---|---|
| 2018/0003805 A1 | 1/2018 | Popovich et al. |
| 2018/0113216 A1 | 4/2018 | Kremer et al. |
| 2019/0025426 A1 | 1/2019 | Satyan et al. |
| 2019/0086514 A1 | 3/2019 | Dussan et al. |
| 2019/0086550 A1 | 3/2019 | Dussan et al. |
| 2019/0187269 A1 | 6/2019 | Tong et al. |
| 2019/0204441 A1 | 7/2019 | Feneyrou et al. |
| 2019/0346568 A1 | 11/2019 | Feng et al. |
| 2019/0353789 A1 | 11/2019 | Boloorian et al. |
| 2019/0369244 A1 | 12/2019 | Asghari et al. |
| 2019/0369251 A1 | 12/2019 | Feng et al. |
| 2019/0391242 A1 | 12/2019 | Asghari et al. |
| 2020/0018857 A1 | 1/2020 | Feng et al. |
| 2020/0025926 A1 | 1/2020 | Asghari et al. |
| 2020/0057143 A1 | 2/2020 | Asghari et al. |
| 2020/0116837 A1 | 4/2020 | Mehdi et al. |

OTHER PUBLICATIONS

Baghmisheh, B. B., "Chip-scale Lidar" University of California, Berkeley, Jan. 19, 2017, Technical Report No. UCB/EECS-2017-4, http://www2.eecs.berkeley.edu/Pubs/TechRpts/2017/EECS-2017-4.html.

Goodman, J., "Speckle Phenomena in Optics", Roberts and Company, 2007.

Issakov, V., (2010), Radar Systems, Ch. 2 In Microwave Circuits for 24GHz Automotive Radar in Silicon-based Technologies. Berlin Heidelberg: Springer-Verlag.

Li, L., (2014), Time-of-Flight Camera—An Introduction. TI Technical White Paper SLOA190B.

Kirscher, Jerome, Extended European Search Report, Application No. 20756701.7, dated Oct. 6, 2022.

Gao, S. and Hui, R., "4. Frequency-modulated continuous-wave lidar using I/Q modulator for simplified heterodyne detection", Optics Letter, vol. 37, No. 11, Jun. 1, 2012, pp. 2022-2024.

Kang, Sung Chul, International Search Report and Written Opinion, PCT/US2019/043828, Korean Intellectual Property Office, dated Nov. 15, 2019.

Pierrottet et al., "Linear FMCW Laser Radar for Precision Range and Vector Velocity Measurements", MRS Online Proceeding Library Archive, Jan. 2008, pp. 1-9.

Wang et al., "Automotive FMCW Radar-enhanced Range Estimation via a Local Resampling Fourier Transform", International Journal of Advanced Robotic Systems, 2016, pp. 1-8.

Wittmann-Regis, Agnes, International Preliminary Report on Patentability and Written Opinion, PCT/US2019/043828, The International Bureau of WIPO, dated Mar. 11, 2021.

Wojtkiewicz et al., "Two-dimensional signal processing in FMCW radars", National Conference on Circuit Theory and Electronic Networks, vol. 2, Oct. 1997, pp. 1-6.

LIDAR SYSTEM WITH REDUCED SPECKLE SENSITIVITY

This application claims the benefit of U.S. Provisional Patent Application Ser. No. 62/803,459, filed on Feb. 9, 2019, entitled "LIDAR System with Reduced Speckle Sensitivity," and incorporated herein in its entirety.

FIELD

The invention relates to optical devices. In particular, the invention relates to LIDAR systems.

BACKGROUND

Speckle is a phenomenon that can impact the performance of LIDAR systems that output coherent LIDAR output signals that are reflected by diffuse reflecting surfaces. Since the surfaces of the reflecting object in LIDAR systems are generally diffuse reflecting surfaces or semi-diffuse reflectors, the majority of the LIDAR output signal reflected by the object is not specularly reflected as would occur from a mirror-like surface, but is instead scattered in multiple directions, forming a LIDAR input signal with multiple wavefronts.

The coherent nature of the LIDAR input signal can result in interference between the multiple wavefronts causing phase and intensity variations. These variations can be a source of bright and dark spots in the far field image, hence the term 'speckle pattern.' For LIDAR applications, these variations can be detrimental to performance as they can cause variable amounts of light to couple back into the LIDAR chip and hence cause signal 'fading' under certain conditions. For a LIDAR output signal at a given wavelength, these conditions will vary with the properties of the surface, the angle of incidence of the LIDAR output signal on the reflecting object, polarization of the LIDAR output signal, the distance of the reflecting object from the source of the LIDAR output signal, and the variations of path length introduced by the atmosphere through which the LIDAR output signal travels between the reflecting object and the source of the LIDAR output signal such as are caused by variations in the density of air.

Because of the nature of diffuse reflectors, the speckle effects will vary with position of the beam on a surface. As a result, rapid motion of the reflecting object can cause signal fading during a measurement period. Because it is an interference effect, the speckle pattern for a given position of a reflecting object and atmosphere conditions will vary with the wavelength and polarization of the LIDAR output signal, and with the distance between the source of the LIDAR output signal and the reflecting object.

Signal fading due to speckle limits the performance of LIDAR systems as it can lead to increased measurement inaccuracy and even to the inability to make a measurement at a given point. As a result, there is a need to provide improved coherent LIDAR systems that have reduced sensitivity to speckle.

SUMMARY

A LIDAR system has one or more LIDAR chips that generate multiple LIDAR output signals. The system also includes electronics that operate the one or more LIDAR chips such that the LIDAR output signals are concurrently directed to the same sample region in a field of view. The LIDAR output signals have one or more optical diversities selected from a group consisting of wavelength diversity, polarization diversity, and diversity of an angle of incidence of the LIDAR output signal on the sample region.

Operating a LIDAR system includes generating multiple LIDAR output signals. The LIDAR output signals are concurrently directed to the same sample region in a field of view such that the LIDAR output signals have one or more optical diversities selected from a group consisting of wavelength diversity, polarization diversity, and diversity of an angle of incidence of the LIDAR output signal on the sample region

DESCRIPTION

Multiple LIDAR output signals are generated and are concurrently directed to the same sample region in a field of view. The LIDAR output signals have one or more optical diversities selected from a group consisting of wavelength diversity, polarization diversity, and diversity of an angle of incidence of the LIDAR output signal relative to a sample region or an object in the sample region. The different LIDAR output signals directed to the sample region can each be used to generate a different LIDAR data result (distance and/or radial velocity between the source of the LIDAR output signal and a reflecting object) for the sample region. As a result, each sample region can have multiple different LIDAR data results that are each associated with a different one of the LIDAR output signals that is directed toward the sample region. Since each of the LIDAR output signals directed to the sample region has different optical characteristics, there is an increased opportunity that the effects of speckle are reduced to an acceptable level or are not present in at least one of the LIDAR data results. As a result, the different LIDAR data results for a sample region are processed so as to reduce the effects of speckle. For instance, the different LIDAR data results can be averaged so as to generate the resultant LIDAR data for the sample region. Alternately, the LIDAR data result that is most likely to have reduced effects from speckle can be identified and used as the resultant LIDAR data. For instance, when a LIDAR output signals is reflected by a reflecting object, a LIDAR input signal results and is received by the LIDAR chip. The LIDAR input signal that is received by the LIDAR chip with the highest power level can be identified and the associated LIDAR data result can be used as the resultant LIDAR data. As a result, the LIDAR system can reduce or even eliminate the effects of speckle from LIDAR data.

Figure 1:
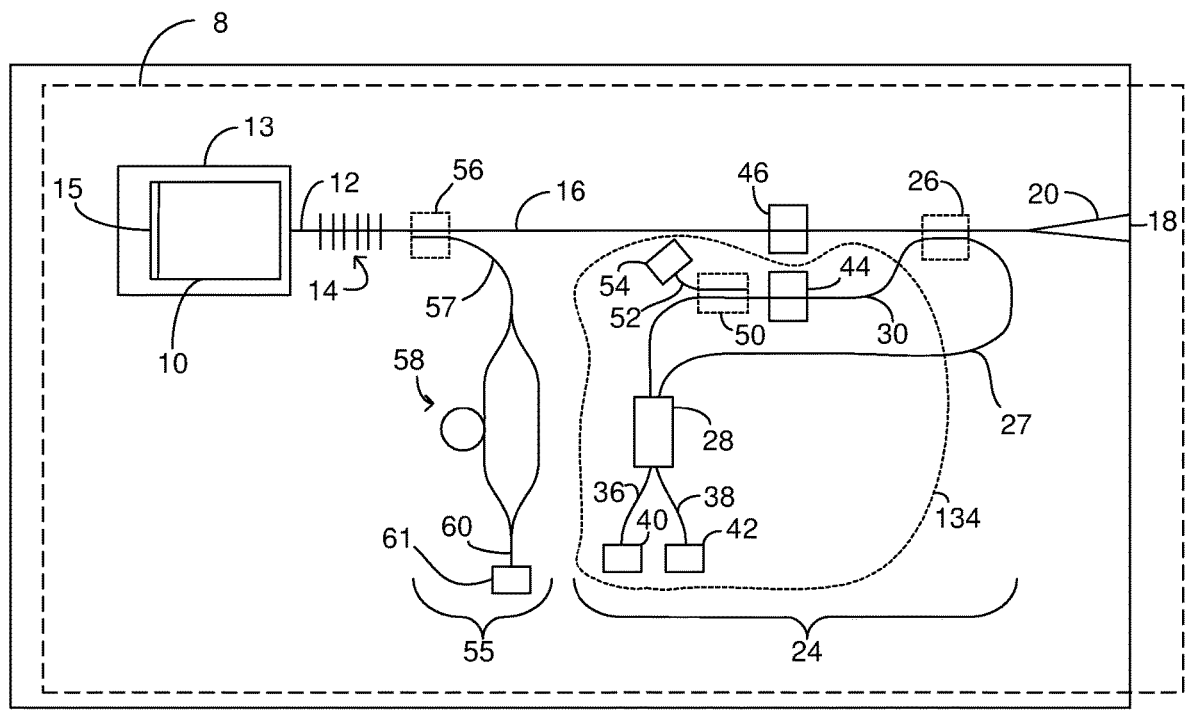
FIG. 1 is a top view of a LIDAR chip.

FIG. 1 is a topview of a LIDAR chip. The illustrated LIDAR chip includes a Photonic Integrated Circuit (PIC) and can be a Photonic Integrated Circuit chip. The LIDAR chip includes a laser cavity. The laser cavity includes a light source 10 that can include or consist of a gain medium (not shown) for a laser. The LIDAR chip also includes a cavity waveguide 12 that receives a light signal from the light source 10. The light source can be positioned in a recess 13 so a facet of the light source is optically aligned with a facet of the cavity waveguide 12 to allow the light source and cavity waveguide 12 to exchange light signals. The cavity waveguide 12 carries the light signal to a partial return device 14. The illustrated partial return device 14 is an optical grating such as a Bragg grating. However, other partial return devices 14 can be used; for instance, mirrors can be used in conjunction with echelle gratings and arrayed waveguide gratings.

The partial return device 14 returns a return portion of the light signal to the cavity waveguide 12 as a return signal. For instance, the cavity waveguide 12 returns the return signal to the light source 10 such that the return portion of the light signal travels through the gain medium. The light source 10 is configured such that at least a portion of the return signal is added to the light signal that is received at the cavity waveguide 12. For instance, the light source 10 can include a highly, fully, or partially reflective device 15 that reflects the return signal received from the gain medium back into the gain medium. As a result, light can resonate between the partial return device 14 and the reflective device 15 so as to form a Distributed Bragg Reflector (DBR) laser cavity. A DBR laser cavity has an inherently narrow-linewidth and a longer coherence length than DFB lasers and accordingly improves performance when an object reflecting the LIDAR output signal from the LIDAR chip is located further away from the LIDAR chip.

The partial return device 14 passes a portion of the light signal received from the cavity waveguide 12 to a utility waveguide 16 included on the LIDAR chip. The portion of the light signal that the utility waveguide 16 receives from the partial return device 14 serves as the output of the laser cavity. The output of the laser cavity serves as an outgoing LIDAR signal on the utility waveguide 16. The utility waveguide 16 terminates at a facet 18 and carries the outgoing LIDAR signal to the facet 18. The facet 18 can be positioned such that the outgoing LIDAR signal traveling through the facet 18 exits the LIDAR chip and serves as a LIDAR output signal. For instance, the facet 18 can be positioned at an edge of the LIDAR chip so the outgoing LIDAR signal traveling through the facet 18 exits the LIDAR chip and serves as a LIDAR output signal.

The LIDAR output signal travels away from the LIDAR chip and is reflected by objects in the path of the LIDAR signal. The reflected signal travels away from the objects. At least a portion of the reflected signal returns to the facet 18 of the utility waveguide 16. Accordingly, a portion of the reflected signal can enter the utility waveguide 16 through the facet 18 and serve as a LIDAR input signal guided by the utility waveguide 16.

The utility waveguide 16 can optionally include a tapered portion before the facet 18. For instance, the utility waveguide 16 can include a taper 20 that terminate at the facet 18. The taper 20 can relax the alignment tolerances required for efficient coupling of the utility waveguide 16 to the LIDAR input light and the outgoing LIDAR signal. Accordingly, the taper 20 can increase the percentage of the LIDAR input signal that is successfully returned to the LIDAR chip for processing. In some instances, the taper 20 is constructed such that the facet 18 has an area that is more than two, five, or ten times the area of a cross section of a straight portion of the utility waveguide 16. Although FIG. 1 shows the taper 20 as a horizontal taper, the taper 20 can be a horizontal and/or vertical taper. The horizontal and/or vertical taper can be linear and/or curved. In some instances, the taper 20 is an adiabatic taper.

The LIDAR chip includes a data branch 24 where the optical signals that carry the LIDAR data are generated. The data branch includes an optical coupler 26 that moves a portion of the light signals from the utility waveguide 16 into the data branch. For instance, an optical coupler 26 couples a portion of the outgoing LIDAR signal from the utility waveguide 16 onto a reference waveguide 27 as a reference signal. The reference waveguide 27 carries the reference signal to a light-combining component 28.

The optical coupler 26 also couples a portion of the LIDAR input signal from the utility waveguide 16 onto a comparative waveguide 30. The portion of the LIDAR input signal coupled onto the comparative waveguide 30 serves as a comparative signal. The comparative signal includes at least a portion of the light from the LIDAR input signal. The comparative signal can exclude light from the reference light signal. The comparative waveguide 30 carries the comparative signal to the light-combining component 28.

The illustrated optical coupler 26 is a result of positioning the utility waveguide 16 sufficiently close to the reference waveguide 27 and the comparative waveguide 30 that light from the utility waveguide 16 is coupled into the reference waveguide 27 and the comparative waveguide 30; however, other signal tapping components can be used to move a portion of the of the light signals from the utility waveguide 16 onto the reference waveguide 27 and the comparative waveguide 30. Examples of suitable signal tapping components include, but are not limited to, y-junctions, multi-mode interference couplers (MMIs), and integrated optical circulators.

The light-combining component 28 combines the comparative signal and the reference signal into a composite signal. The reference signal includes light from the outgoing LIDAR signal. For instance, the reference signal can serve as a sample of the outgoing LIDAR signal. The reference signal can exclude light from the LIDAR output signal and the LIDAR input signal. In contrast, the comparative signal light includes light from the LIDAR input signal. For instance, the comparative signal can serve as a sample of the LIDAR input signal. Accordingly, the comparative signal has been reflected by an object located off of the LIDAR chip while the LIDAR output signal has not been reflected by an object located off of the LIDAR chip. When the LIDAR chip and the reflecting object are moving relative to one another, the comparative signal and the reference signal have different frequencies due to the Doppler effect. As a result, beating occurs between the comparative signal and the reference signal.

The light-combining component 28 also splits the resulting composite sample signal onto a first detector waveguide 36 and a second detector waveguide 38. The first detector waveguide 36 carries a first portion of the composite sample signal to a first light sensor 40 that converts the first portion of the composite sample signal to a first electrical signal. The second detector waveguide 38 carries a second portion of the composite sample signal to a second light sensor 42 that converts the second portion of the composite sample signal to a second electrical signal. Examples of suitable light sensors include germanium photodiodes (PDs), and avalanche photodiodes (APDs).

The light combining component 28, the first light sensor 40 and the second light sensor 42 can be connected as a balanced photodetector that outputs an electrical data signal. For instance, the light combining component 28, the first light sensor 40 and the second light sensor 42 can be connected such that the DC components of the signal photocurrents cancel, improving detection sensitivity. Suitable methods for connecting the first light sensor 40 and the second light sensor 42 as balanced photodetectors includes connecting the first light sensor 40 and the second light sensor 42 in series. In one example, the first light sensor 40 and the second light sensor 42 are both avalanche photodiodes connected in series. Balanced photodetection is desirable for detection of small signal fluctuations.

An example of a suitable light-combining component 28 is a Multi-Mode Interference (MMI) device such as a 2×2 MMI device. Other suitable light-combining components 28 include, but are not limited to, adiabatic splitters, and directional coupler. In some instances, the functions of the illustrated light-combining component 28 are performed by more than one optical component or a combination of optical components.

A single light sensor can replace the first light sensor 40 and the second light sensor 42 and can output the data signal. When a single light sensor replaces the first light sensor 40 and the second light sensor 42, the light-combining component 28 need not include light-splitting functionality. As a result, the illustrated light light-combining component 28 can be a 2×1 light-combining component rather than the illustrated 2×1 light-combining component. For instance, the illustrated light light-combining component can be a 2×1 MMI device. In these instances, the LIDAR chip includes a single detector waveguide that carries the composite sample signal to the light sensor.

The data branch includes a data optical attenuator 44 positioned along the comparative waveguide 30 such that the data optical attenuator 44 can be operated so as to attenuate the comparative signal on the comparative waveguide 30. The LIDAR chip also includes an output optical attenuator 46 positioned along the utility waveguide 16 such that the output optical attenuator 46 can be operated so as to attenuate the outgoing LIDAR signal on the utility waveguide 16. Suitable attenuators for the data optical attenuator 44 and/or the output optical attenuator 46 are configured to attenuate intensity of a light signal. Examples of a suitable attenuator configured to attenuate intensity of a light signal include carrier-injection based PIN diodes, electro-absorption modulators, and Mach-Zehnder (MZ) modulators.

The LIDAR chip also includes a sampling directional coupler 50 that couples a portion of the comparative signal from the comparative waveguide 30 onto a sampling waveguide 52. The coupled portion of the comparative signal serves as a sampling signal. The sampling waveguide 52 carries the sampling signal to a sampling light sensor 54. Although FIG. 1 illustrates a sampling directional coupler 50 moving a portion of the comparative signal onto the sampling waveguide 52, other signal tapping components can be used to move a portion of the comparative signal from the comparative waveguide 30 onto the sampling waveguide 52. Examples of suitable signal tapping components include, but are not limited to, y-junctions, and MMIs.

The LIDAR chip includes a control branch 55 for controlling operation of the laser cavity. The control branch includes a directional coupler 56 that moves a portion of the outgoing LIDAR signal from the utility waveguide 16 onto a control waveguide 57. The coupled portion of the outgoing LIDAR signal serves as a tapped signal. Although FIG. 1 illustrates a directional coupler 56 moving portion of the outgoing LIDAR signal onto the control waveguide 57, other signal-tapping components can be used to move a portion of the outgoing LIDAR signal from the utility waveguide 16 onto the control waveguide 57. Examples of suitable signal tapping components include, but are not limited to, y-junctions, and MMIs.

The control waveguide 57 carries the tapped signal to an interferometer 58 that splits the tapped signal and then re-combines the different portions of the tapped signal with a phase differential between the portions of the tapped signal. The illustrated interferometer 58 is a Mach-Zehnder interferometer; however, other interferometers can be used.

The interferometer 58 outputs a control light signal on an interferometer waveguide 60. The interferometer waveguide 60 carries the control light signal to a control light sensor 61 that converts the control light signal to an electrical signal that serves as an electrical control signal. The interferometer signal has an intensity that is a function of the frequency and/or change in frequency of the outgoing LIDAR signal. For instance, a Mach-Zehnder interferometer will output a sinusoidal control light signal with a fringe pattern. Changes to the frequency of the outgoing LIDAR signal will cause changes to the frequency of the control light signal. Accordingly, the frequency of the electrical control signal output from the control light sensor 61 is a function of the frequency of the outgoing LIDAR signal. Other detection mechanisms can be used in place of the control light sensor 61. For instance, the control light sensor 61 can be replaced with a balanced photodetector arranged as the light combining component 28, the first light sensor 40 and the second light sensor 42.

Electronics 62 can operate one or more components on the LIDAR chip. For instance, the electronics 62 can be in electrical communication with and control operation of the light source 10, the data optical attenuator 44, output optical attenuator 46, the first light sensor 40, the second light sensor 42, the sampling light sensor 54, and the control light sensor 61. Although the electronics 62 are shown off the LIDAR chip, all or a portion of the electronics can be included on the LIDAR chip. For instance, the LIDAR chip can include electrical conductors that connect the first light sensor 40 in series with the second light sensor 42.

During operation of the LIDAR chip, the electronics 62 operate the light source 10 such that the laser cavity outputs the outgoing LIDAR signal. The electronics 62 then operate the LIDAR chip through a series of cycles where each cycle generates LIDAR data for a sample region in a field of view. During each cycle, the data signal is sampled multiple times. During each of the samples, the electronics tune the frequency of the outgoing LIDAR signal. As will be described in more detail below, the electronics can employ output from the control branch in order to control the frequency of the outgoing LIDAR signal such that the frequency of the outgoing LIDAR signal as a function of time is known to the electronics. In some instance, a cycle includes at least a first sample and a second sample. During the first sample, the electronics 62 can increase the frequency of the outgoing LIDAR signal and during a second sample the electronics 62 can decrease the frequency of the outgoing LIDAR signal. For instance, the laser cavity can be configured to output an outgoing LIDAR signal (and accordingly a LIDAR output signal) with a wavelength of 1550 nm. During the first sample, the electronics 62 can increase the frequency of the outgoing LIDAR signal (and accordingly a LIDAR output signal) such that the wavelength decreases from 1550 nm to 1459.98 nm followed by decreasing the frequency of the outgoing LIDAR signal such that the wavelength increases from 1459.98 nm to 1550 nm.

When the outgoing LIDAR signal frequency is increased during the first sample, the LIDAR output signal travels away from the LIDAR chip and then returns to the LIDAR chip as a LIDAR input signal. A portion of the LIDAR input signal becomes the comparative signal. During the time that the LIDAR output signal and the LIDAR input signal are traveling between the LIDAR chip and a reflecting object, the frequency of the outgoing LIDAR signal continues to increase. Since a portion of the outgoing LIDAR signal becomes the reference signal, the frequency of the reference signal continues to increase. As a result, the comparative signal enters the light-combining component with a lower frequency than the reference signal concurrently entering the light-combining component. Additionally, the further the reflecting object is located from the LIDAR chip, the more the frequency of the reference signal increases before the LIDAR input signal returns to the LIDAR chip. Accordingly, the larger the difference between the frequency of the comparative signal and the frequency of the reference signal, the further the reflecting object is from the LIDAR chip. As a result, the difference between the frequency of the comparative signal and the frequency of the reference signal is a function of the distance between the LIDAR chip and the reflecting object.

For the same reasons, when the outgoing LIDAR signal frequency is decreased during the second sample, the comparative signal enters the light-combining component with a higher frequency than the reference signal concurrently entering the light-combining component and the difference between the frequency of the comparative signal and the frequency of the reference signal during the second sample is also function of the distance between the LIDAR chip and the reflecting object.

In some instances, the difference between the frequency of the comparative signal and the frequency of the reference signal can also be a function of the Doppler effect because relative movement of the LIDAR chip and reflecting object can also affect the frequency of the comparative signal. For instance, when the LIDAR chip is moving toward or away from the reflecting object and/or the reflecting object is moving toward or away from the LIDAR chip, the Doppler effect can affect the frequency of the comparative signal. Since the frequency of the comparative signal is a function of the speed the reflecting object is moving toward or away from the LIDAR chip and/or the speed the LIDAR chip is moving toward or away from the reflecting object, the difference between the frequency of the comparative signal and the frequency of the reference signal is also a function of the speed the reflecting object is moving toward or away from the LIDAR chip and/or the speed the LIDAR chip is moving toward or away from the reflecting object. Accordingly, the difference between the frequency of the comparative signal and the frequency of the reference signal is a function of the distance between the LIDAR chip and the reflecting object and is also a function of the Doppler effect.

The composite sample signal and the data signal each effectively compares the comparative signal and the reference signal. For instance, since the light-combining component combines the comparative signal and the reference signal and these signals have different frequencies, there is beating between the comparative signal and reference signal. Accordingly, the composite sample signal and the data signal have a beat frequency related to the frequency difference between the comparative signal and the reference signal and the beat frequency can be used to determine the difference in the frequency of the comparative signal and the reference signal. A higher beat frequency for the composite sample signal and/or the data signal indicates a higher differential between the frequencies of the comparative signal and the reference signal. As a result, the beat frequency of the data signal is a function of the distance between the LIDAR chip and the reflecting object and is also a function of the Doppler effect.

As noted above, the beat frequency is a function of two unknowns; the distance between the LIDAR chip and the reflecting object and the relative velocity of the LIDAR chip and the reflecting object (i.e., the contribution of the Doppler effect). The change in the frequency difference between the comparative signal and the reference signal ($\Delta f$) is given by $\Delta f = 2\Delta v f/c$ where f is the frequency of the LIDAR output signal and accordingly the reference signal, $\Delta v$ is the relative velocity of the LIDAR chip and the reflecting object and c is the speed of light in air. The use of multiple different samples permits the electronics 62 to resolve the two unknowns. For instance, the beat frequency determined for the first sample is related to the unknown distance and Doppler contribution and the beat frequency determined for the second sample is also related to the unknown distance and Doppler contribution. The availability of the two relationships allows the electronics 62 to resolve the two unknowns. Accordingly, the distance between the LIDAR chip and the reflecting object can be determined without influence from the Doppler effect. Further, in some instances, the electronics 62 use this distance in combination with the Doppler effect to determine the velocity of the reflecting object toward or away from the LIDAR chip.

In instances where the relative velocity of target and source is zero or very small, the contribution of the Doppler effect to the beat frequency is essentially zero. In these instances, the Doppler effect does not make a substantial contribution to the beat frequency and the electronics 62 can take only the first sample to determine the distance between the LIDAR chip and the reflecting object.

During operation, the electronics 62 can adjust the frequency of the outgoing LIDAR signal in response to the electrical control signal output from the control light sensor

61. As noted above, the magnitude of the electrical control signal output from the control light sensor 61 is a function of the frequency of the outgoing LIDAR signal. Accordingly, the electronics 62 can adjust the frequency of the outgoing LIDAR signal in response to the magnitude of the control. For instance, while changing the frequency of the outgoing LIDAR signal during one of the samples, the electronics 62 can have a range of suitable values for the electrical control signal magnitude as a function of time. At multiple different times during a sample, the electronics 62 can compare the electrical control signal magnitude to the range of values associated with the current time in the sample. If the electrical control signal magnitude indicates that the frequency of the outgoing LIDAR signal is outside the associated range of electrical control signal magnitudes, the electronics 62 can operate the light source 10 so as to change the frequency of the outgoing LIDAR signal so it falls within the associated range. If the electrical control signal magnitude indicates that the frequency of the outgoing LIDAR signal is within the associated range of electrical control signal magnitudes, the electronics 62 do not change the frequency of the outgoing LIDAR signal.

During operation, the electronics 62 can adjust the level of attenuation provided by the output optical attenuator 46 in response to the sampling signal from the sampling light sensor 54. For instance, the electronics 62 operate the output optical attenuator 46 so as to increase the level of attenuation in response to the magnitude of the sampling signal being above a first signal threshold and/or decrease the magnitude of the power drop in response to the magnitude of the sampling signal being below a second signal threshold.

In some instances, the electronics 62 adjust the level of attenuation provided by the output optical attenuator 46 to prevent or reduce the effects of back-reflection on the performance of the laser cavity. For instance, the first signal threshold and/or the second signal threshold can optionally be selected to prevent or reduce the effects of back-reflection on the performance of the laser cavity. Back reflection occurs when a portion of the LIDAR input signal returns to the laser cavity as a returned LIDAR signal. In some instances, on the order of 50% of the LIDAR input signal that passes through the facet 18 returns to the laser cavity. The returned LIDAR signal can affect performance of the laser cavity when the power of the returned LIDAR signal entering the partial return device 14 does not decrease below the power of the outgoing LIDAR signal exiting from the partial return device 14 ("power drop") by more than a minimum power drop threshold. In the illustrated LIDAR chip, the minimum power drop threshold can be around 35 dB (0.03%). Accordingly, the returned LIDAR signal can affect the performance of the laser cavity when the power of the returned LIDAR signal entering the partial return device 14 is not more than 35 dB below the power of the outgoing LIDAR signal exiting from the partial return device 14.

The electronics 62 can operate the output optical attenuator 46 so as to reduce the effect of low power drops, e.g. when the target object is very close or highly reflective or both. As is evident from FIG. 1, operation of the output optical attenuator 46 so as to increase the level of attenuation reduces the power of the returned LIDAR signal entering the partial return device 14 and also reduces the power of the returned outgoing LIDAR signal at a location away from the partial return device 14. Since the output optical attenuator 46 is located apart from the partial return device 14, the power of the outgoing LIDAR signal exiting from the partial return device 14 is not directly affected by the operation of the output optical attenuator 46. Accordingly, the operation of the output optical attenuator 46 so as to increase the level of attenuation increases the level of the power drop. As a result, the electronics can employ the optical attenuator 46 so as to tune the power drop.

Additionally, the magnitude of the sampling signal is related to the power drop. For instance, the magnitude of the sampling signal is related to the power of the comparative signal as is evident from FIG. 1. Since the comparative signal is a portion of the LIDAR input signal, the magnitude of the sampling signal is related to the power of the LIDAR input signal. This result means the magnitude of the sampling signal is also related to the power of the returned LIDAR signal because the returned LIDAR signal is a portion of the LIDAR input signal. Accordingly, the magnitude of the sampling signal is related to the power drop.

Since the magnitude of the sampling signal is related to the power drop, the electronics 62 can use the magnitude of the sampling signal to operate the output optical attenuator so as to keep the magnitude of the comparative signal power within a target range. For instance, the electronics 62 can operate the output optical attenuator 46 so as to increase the magnitude of the power drop in response to the sampling signal indicating that the magnitude of power drop is at or below a first threshold and/or the electronics 62 can operate the output optical attenuator 46 so as to decrease the magnitude of the power drop in response to the sampling signal indicating that the magnitude of power drop is at or above a second threshold. In some instances, the first threshold is greater than or equal to the minimum power drop threshold. In one example, the electronics 62 operate the output optical attenuator 46 so as to increase the magnitude of the power drop in response to the magnitude of the sampling signal being above a first signal threshold and/or decrease the magnitude of the power drop in response to the magnitude of the sampling signal being below a second signal threshold. The identification of the value(s) for one, two, three, or four variables selected from the group consisting of the first threshold, the second threshold, the first signal threshold, and the second signal threshold can be determined from calibration of the LIDAR chip during set-up of the LIDAR chip system.

Light sensors can become saturated when the power of the composite light signal exceeds a power threshold. When a light sensor becomes saturated, the magnitude of the data signal hits a maximum value that does not increase despite additional increases in the power of the composite light signal above the power threshold. Accordingly, data can be lost when the power of the composite light signal exceeds a power threshold. During operation, the electronics 62 can adjust the level of attenuation provided by the data optical attenuator 44 so the power of the composite light signal is maintained below a power threshold.

As is evident from FIG. 1, the magnitude of the sampling signal is related to the power of the comparative signal. Accordingly, the electronics 62 can operate the data optical attenuator 44 in response to output from the sampling signal. For instance, the electronics 62 can operate the data optical attenuator so as to increase attenuation of the comparative signal when the magnitude of the sampling signal indicates the power of the comparative signal is above an upper comparative signal threshold and/or can operate the data optical attenuator so as to decrease attenuation of the comparative signal when the magnitude of the sampling signal indicates the power of the comparative signal is below a lower comparative signal threshold. For instance, in some instances, the electronics 62 can increase attenuation of the comparative signal when the magnitude of the sampling signal is at or above an upper comparative threshold and/or the electronics 62 decrease attenuation of the comparative signal when the magnitude of the sampling signal is at or below an upper comparative signal threshold.

Figure 2:
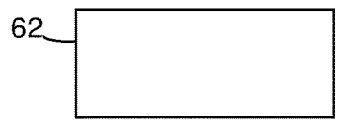
FIG. 2 is a cross-section of a portion of a LIDAR chip according to FIG. 1 constructed from a silicon-on-insulator wafer.
Figure 2:
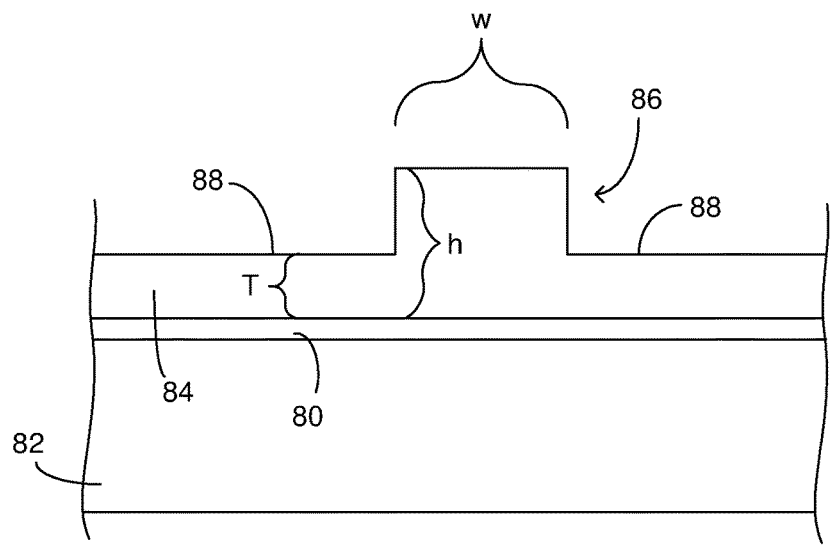

As noted above, the electronics 62 can adjust the level of attenuation provided by the output optical attenuator 46 in response to the sampling signal. The electronics 62 can adjust the level of attenuation provided by the data optical attenuator 44 in response to the sampling signal in addition or as an alternative to adjusting the level of attenuation provided by the output optical attenuator 46 in response to the sampling signal Suitable platforms for the LIDAR chip include, but are not limited to, silica, indium phosphide, and silicon-on-insulator wafers. FIG. 2 is a cross-section of portion of a LIDAR chip constructed on a silicon-on-insulator wafer platform. A silicon-on-insulator (SOI) wafer includes a buried layer 80 between a substrate 82 and a light-transmitting medium 84. In a silicon-on-insulator wafer, the buried layer is silica while the substrate and the light-transmitting medium are silicon. The substrate of an optical platform such as an SOI wafer can serve as the base for the entire LIDAR chip. For instance, the optical components shown in FIG. 1 can be positioned on or over the top and/or lateral sides of the substrate.

The portion of the LIDAR chip illustrated in FIG. 2 includes a waveguide construction that is suitable for use with LIDAR chips constructed from silicon-on-insulator wafers. A ridge 86 of the light-transmitting medium extends away from slab regions 88 of the light-transmitting medium. The light signals are constrained between the top of the ridge and the buried oxide layer.

The dimensions of the ridge waveguide are labeled in FIG. 2. For instance, the ridge has a width labeled w and a height labeled h. A thickness of the slab regions is labeled T. For LIDAR applications, these dimensions are more important than other applications because of the need to use higher levels of optical power than are used in other applications. The ridge width (labeled w) is greater than 1 μm and less than 4 μm, the ridge height (labeled h) is greater than 1 μm and less than 4 μm, the slab region thickness is greater than 0.5 μm and less than 3 μm. These dimensions can apply to straight or substantially straight portions of the waveguide, curved portions of the waveguide and tapered portions of the waveguide(s). Accordingly, these portions of the waveguide will be single mode. However, in some instances, these dimensions apply to straight or substantially straight portions of a waveguide while curved portions of the waveguide and/or tapered portions of the waveguide have dimensions outside of these ranges. For instance, the tapered portions of the utility waveguide 16 illustrated in FIG. 1 can have a width and/or height that is >4 μam and can be in a range of 4 μm to 12 μm. Additionally or alternately, curved portions of a waveguide can have a reduced slab thickness in order to reduce optical loss in the curved portions of the waveguide. For instance, a curved portion of a waveguide can have a ridge that extends away from a slab region with a thickness greater than or equal to 0.0 μm and less than 0.5 μm. While the above dimensions will generally provide the straight or substantially straight portions of a waveguide with a single-mode construction, they can result in the tapered section(s) and/or curved section(s) that are multi-mode. Coupling between the multi-mode geometry to the single mode geometry can be done using tapers that do not substantially excite the higher order modes. Accordingly, the waveguides can be constructed such that the signals carried in the waveguides are carried in a single mode even when carried in waveguide sections having multi-mode dimensions. The waveguide construction of FIG. 2 is suitable for all or a portion of the waveguides selected from the group consisting of the cavity waveguide 12, utility waveguide 16, reference waveguide 27, comparative waveguide 30, first detector waveguide 36, second detector waveguide 38, sampling waveguide 52, control waveguide 57, and interferometer waveguide 60. The waveguide construction disclosed in the context of FIG. 2 is also suitable for steering waveguides that will be disclosed below.

The light source 10 that is interfaced with the utility waveguide 16 can be a gain element that is a component separate from the LIDAR chip and then attached to the LIDAR chip. For instance, the light source 10 can be a gain element that is attached to the LIDAR chip using a flip-chip arrangement.

Use of flip-chip arrangements is suitable when the light source 10 is to be interfaced with a ridge waveguide on a LIDAR chip constructed from silicon-on-insulator wafer. Examples of suitable interfaces between flip-chip gain elements and ridge waveguides on chips constructed from silicon-on-insulator wafer can be found in U.S. Pat. No. 9,705,278, issued on Jul. 11, 2017 and in U.S. Pat. No. 5,991,484 issued on Nov. 23 1999; each of which is incorporated herein in its entirety. The constructions are suitable for use as the light source 10. When the light source 10 is a gain element, the electronics 62 can change the frequency of the outgoing LIDAR signal by changing the level of electrical current applied to through the gain element.

The attenuators can be a component that is separate from the LIDAR chip and then attached to the LIDAR chip. For instance, the attenuator can be included on an attenuator chip that is attached to the LIDAR chip in a flip-chip arrangement. The use of attenuator chips is suitable for all or a portion of the attenuators selected from the group consisting of the data attenuator and the control attenuator.

As an alternative to including an attenuator on a separate component, all or a portion of the attenuators can be integrated with the LIDAR chip. For instance, examples of attenuators that are interfaced with ridge waveguides on a LIDAR chip constructed from a silicon-on-insulator wafer can be found in U.S. Patent No. 5,908,305, issued on Jun. 1 1999; each of which is incorporated herein in its entirety. The use of attenuators that are integrated with the LIDAR chip are suitable for all or a portion of the light sensors selected from the group consisting of the data attenuator and the control attenuator.

Light sensors that are interfaced with waveguides on a LIDAR chip can be a component that is separate from the LIDAR chip and then attached to the LIDAR chip. For instance, the light sensor can be a photodiode, or an avalanche photodiode. Examples of suitable light sensor components include, but are not limited to, InGaAs PIN photodiodes manufactured by Hamamatsu located in Hamamatsu City, Japan, or an InGaAs APD (Avalanche Photo Diode) manufactured by Hamamatsu located in Hamamatsu City, Japan. These light sensors can be centrally located on the LIDAR chip as illustrated in FIG. 1. Alternately, all or a portion the waveguides that terminate at a light sensor can terminate at a facet 18 located at an edge of the LIDAR chip and the light sensor can be attached to the edge of the LIDAR chip over the facet 18 such that the light sensor receives light that passes through the facet 18. The use of light sensors that are a separate component from the LIDAR chip is suitable for all or a portion of the light sensors selected from the group consisting of the first light sensor

40, the second light sensor 42, the sampling light sensor 54, and the control light sensor 61.

As an alternative to a light sensor that is a separate component, all or a portion of the light sensors can be integrated with the LIDAR chip. For instance, examples of light sensors that are interfaced with ridge waveguides on a LIDAR chip constructed from a silicon-on-insulator wafer can be found in Optics Express Vol. 15, No. 21, 13965-13971 (2007); U.S. Pat. No. 8,093,080, issued on Jan. 10 2012; U.S. Pat. No. 8,242,432, issued Aug. 14 2012; and U.S. Pat. No. 61,088,472, issued on Aug. 22, 2000 each of which is incorporated herein in its entirety. The use of light sensors that are integrated with the LIDAR chip are suitable for all or a portion of the light sensors selected from the group consisting of the first light sensor 40, the second light sensor 42, the sampling light sensor 54, and the control light sensor 61.

Construction of optical gratings that are integrated with a variety of optical device platforms are available. For instance, a Bragg grating can be formed in a ridge waveguides by forming grooves in the top of the ridge and/or in the later sides of the ridge.

Figure 3A:
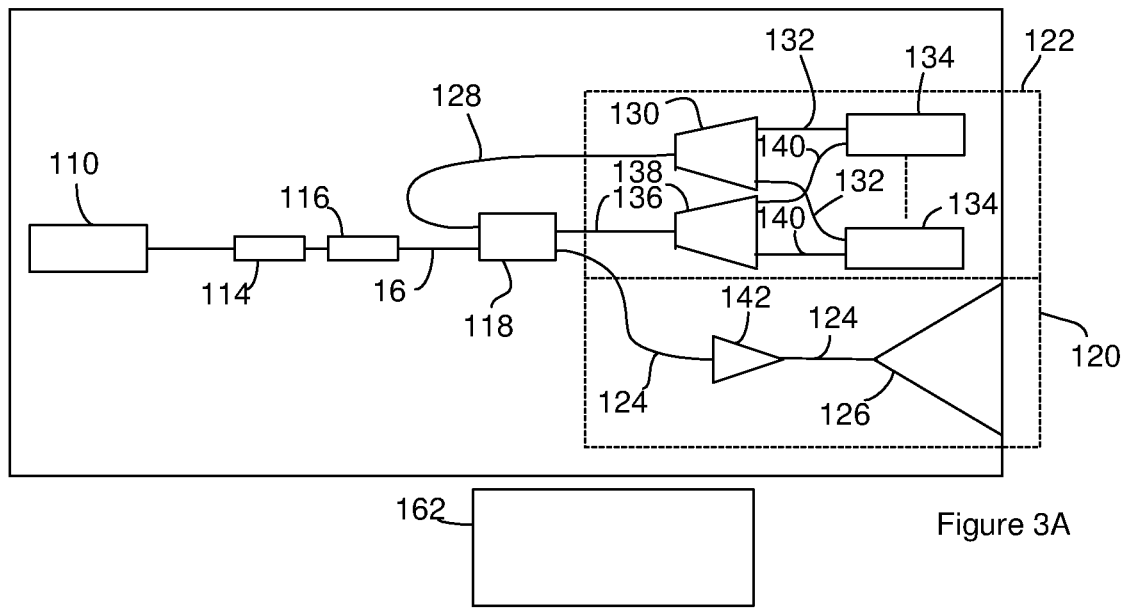
FIG. 3A is a schematic of a LIDAR system.

The LIDAR chip can be modified to generate one LIDAR output signal or multiple different LIDAR output signals. For instance, FIG. 3A is a schematic of the LIDAR chip of FIG. 1 modified to generate one or more different LIDAR output signals. The LIDAR chip includes a light source 110 that outputs an outgoing light signal that includes one or more different channels that are each at a different wavelength. The wavelengths of the channels can be periodically spaced in that the wavelength increase from one channel to the next channel is constant or substantially constant. A suitable light source 110 for generating a single channel is disclosed in the context of FIG. 1 through FIG. 2. A suitable light source 110 for generating multiple channels with periodically spaced wavelengths includes, but is not limited to, comb lasers, multiple single wavelength lasers multiplexed into to single optical waveguide, sources such as that described in U.S. patent application Ser. No. 11/998,846, filed on Nov. 30, 2017, grated U.S. Pat. No. 7,542,641, entitled "Multi-Channel Optical Device," and incorporated herein in its entirety.

The utility waveguide 16 receives the outgoing light signal from the light source 110. A modulator 114 is optionally positioned along the utility waveguide 16. The modulator 114 is configured to modulate the power of the outgoing light signal and accordingly the LIDAR output signal(s). The electronics 62 can operate the modulator 114. Accordingly, the electronics 62 can modulate the power of the outgoing LIDAR signal and accordingly the LIDAR output signal(s). Suitable modulators 114 include, but are not limited to, PIN diode carrier injection devices, Mach-Zehnder modulator devices, and electro-absorption modulator devices. When the modulator 114 is constructed on a silicon-on-insulator platform, a suitable modulator is disclosed in U.S. patent application Ser. No. 617,810, filed on Sep. 21 1993, entitled Integrated Silicon PIN Diode Electro-Optic Waveguide, and incorporated herein in its entirety.

An amplifier 116 is optionally positioned along the utility waveguide 16. Since the power of the outgoing light signal is distributed among multiple channels, the amplifier 116 may be desirable to provide each of the channels with the desired power level on the utility waveguide 16. Suitable amplifiers include, but are not limited to, semiconductor optical amplifiers (SOAs).

The utility waveguide 16 carries the outgoing light signal from the modulator 114 to a signal-directing component 118.

The signal-directing component 118 can direct the outgoing light signal to a LIDAR branch 120 and/or a data branch 122. The LIDAR branch outputs LIDAR output signals and receives LIDAR input signals. The data branch processes the LIDAR input signals for the generation of LIDAR data (distance and/or radial velocity between the source of the LIDAR output signal and a reflecting object).

The LIDAR branch includes a LIDAR signal waveguide 124 that receives at least a portion of the outgoing light signal from the signal-directing component 118. The LIDAR signal waveguide 124 carries at least a portion of the outgoing light signal to an output component 126. When the outgoing light signal includes multiple different channels at different wavelengths, the output component 126 separates the outgoing light signal into multiple LIDAR output signals that are each at a different wavelength (channel) and are directed to different sample regions in a field of view. The output component 126 outputs the LIDAR output signals which can be reflected by a reflecting object (not shown) located outside of the LIDAR system. The reflected LIDAR output signals return to the output component 126 as LIDAR input signals. The output component 126 combines the LIDAR input signals and outputs the result on the LIDAR signal waveguide 124 as an incoming light signal.

In some instances, the output component 126 also includes beam steering functionality. In these instances, the output component 126 can be in electrical communication with the electronics 62. The electronics 62 can operate the output component 126 so as to steer the LIDAR output signals to different sample regions in the field of view. The output component 126 and/or electronics 62 can be configured such that the different LIDAR output signals are steered independently or are steered concurrently.

Although the output component 126 is illustrated as a single component, the output component 126 can include multiple optical components and/or electrical components. Suitable output components 126 include, but are not limited to, optical phased arrays (OPAs), transmission diffraction gratings, reflection diffraction gratings, and Diffractive Optical Elements (DOE). Suitable output components 126 with beam steering capability include, but are not limited to, optical phased arrays (OPAs) with active phase control elements on the array waveguides.

The LIDAR signal waveguide 124 carries the incoming light signal to the signal-directing component 118. The signal-directing component 118 directs the incoming light signal to the utility waveguide 16 and/or a comparative signal waveguide 128. The portion of the incoming light signal-directed to the comparative signal waveguide 128 serves a comparative incoming light signal.

The comparative signal waveguide 128 carries the comparative incoming light signal to a comparative demultiplexer 130. When the comparative light signal includes multiple channels, the comparative demultiplexer 130 divides the comparative incoming light signal into different comparative signals that each has a different wavelength. The comparative demultiplexer 130 outputs the comparative signals on different comparative waveguides 132. The comparative waveguides 132 each carry one of the comparative signals to different processing components 134.

The signal-directing component 118 is configured such that when the signal-directing component 118 directs at least a portion of the incoming light signal to the comparative waveguide 132, the signal-directing component 118 also directs at least a portion of the outgoing light signal to a reference signal waveguide 136. The portion of the outgoing light signal received by the reference signal waveguide 136 serves as a reference light signal.

The reference signal waveguide 136 carries the reference light signal to a reference demultiplexer 138. When the reference light signal includes multiple channels, the reference demultiplexer 138 divides the reference light signal into different reference signals that each has a different wavelength. The reference demultiplexer 138 outputs the reference signals on different reference waveguides 140. The reference waveguides 140 each carry one of the reference signals to a different one of the processing components 134.

The comparative waveguides 132 and the reference waveguides 140 are configured such that a comparative signal and the corresponding reference signal are received at the same processing component 134. For instance, the comparative waveguides 132 and the reference waveguides 140 are configured such that the comparative signal and the corresponding reference signal of the same wavelength are received at the same processing component 134.

As will be described in more detail below, the processing components 134 each combines a comparative signal with the corresponding reference signal to form a composite signal that carries LIDAR data for a sample region on the field of view. Accordingly, the composite signal can be processed so as to extract LIDAR data for the sample region.

The signal-directing component 118 can be an optical coupler. When the signal-directing component 118 is an optical coupler, the signal-directing component 118 directs a first portion of the outgoing light signal to the LIDAR signal waveguide 124 and a second portion of the outgoing light signal to the reference signal waveguide 136 and also directs a first portion of the incoming light signal to the utility waveguide 16 and a second portion of the incoming light signal to the comparative signal waveguide 128. Accordingly, the second portion of the incoming light signal can serve as the comparative incoming light signal and the second portion of the outgoing light signal can serve as the reference light signal.

The signal-directing component 118 can be an optical switch such as a cross-over switch. A suitable cross-over switch can be operated in a cross mode or a pass mode. In the pass mode, the outgoing light signal is directed to the LIDAR signal waveguide 124 and an incoming light signal would be directed to the utility waveguide 16. In the cross mode, the outgoing light signal is directed to the reference signal waveguide 136 and the incoming light signal is directed to the comparative signal waveguide 128. Accordingly, the incoming light signal or a portion of the incoming light signal can serve as the comparative light signal and the outgoing light signal or a portion of the outgoing light signal can serve as the reference light signal.

An optical switch such as a cross-over switch can be controlled by the electronics. For instance, the electronics can control operate the switch such that the switch is in the cross mode or a pass mode. When the LIDAR output signal is to be transmitted from the LIDAR system, the electronics operate the switch such that the switch is in the pass mode. When the LIDAR input signal is to be received by the LIDAR system, the electronics operate the switch such that the switch is in the cross-over mode. The use of a switch can provide lower levels of optical loss than are associated with the use of an optical coupler as the signal-directing component 118.

In the above descriptions of the operation of the signal-directing component 118, the comparative light signals and the reference light signals are concurrently directed to the data branch. As a result, the processing components 34 can each combine a comparative signal with the corresponding reference signal.

In some instances, an optical amplifier 142 is optionally positioned along the LIDAR signal waveguide 124 and is configured to provide amplification of the outgoing light signal and/or of the incoming light signal. Accordingly, the effects of optical loss at the signal-directing component 118 can be reduced.

Light from a laser source is typically linearly polarized and hence the LIDAR output signal is also typically linearly polarized. Reflection from a target may change the angle of polarization of the returned light. Accordingly, the LIDAR input signal can include light of different linear polarities. For instance, a first portion of a LIDAR input signal can include light of a first linear polarization and a second portion of a LIDAR input signal can include light of a second linear polarization. The intensity of the resulting composite signals is proportional to the square of the cosine of the angle between the comparative and reference signal polarizations. If the angle is 90 degrees, the LIDAR data can be lost in the resulting composite signal. As a result, the LIDAR system can be modified to compensate for changes in polarization of the LIDAR output signal.

Figure 3B:
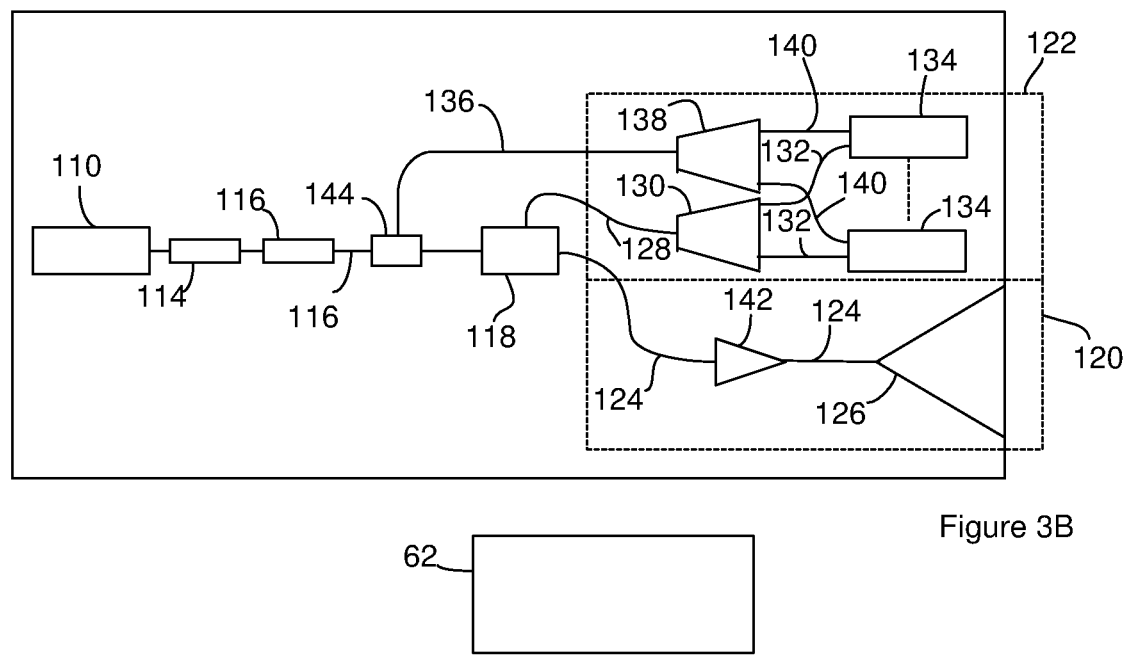
FIG. 3B is a schematic of another embodiment of a LIDAR system.

FIG. 3B illustrates the LIDAR system of FIG. 3A modified to include an optical circulator as the signal-directing component 118. The optical circulator is configured such that the outgoing light signal is directed to the LIDAR signal waveguide 124 and the incoming light signal is directed to the comparative signal waveguide 128. The comparative signal waveguide 128 carries the comparative incoming light signal to the comparative demultiplexer 130. Additionally, a tap component 144 is positioned along the utility waveguide 16. The tap component 144 is configured to tap off a first portion of the outgoing light signal such that the first portion of the outgoing light signal is received on the reference signal waveguide 136. The first portion of the outgoing light signal received by the reference signal waveguide 136 serves as the reference light signal. The reference signal waveguide 136 carries the reference light signal to the reference demultiplexer 138. Accordingly, the electronics can operate the LIDAR system of FIG. 3B as disclosed in the context of FIG. 3A. Suitable optical circulators include, but are not limited to, Faraday rotator based optical fiber circulators, and integrated optical circulators. Although the signal-directing component 118 of FIG. 3B is disclosed as an optical circulator, the signal-directing component 118 of FIG. 3B can be an optical coupler or optical switch.

Figure 4:
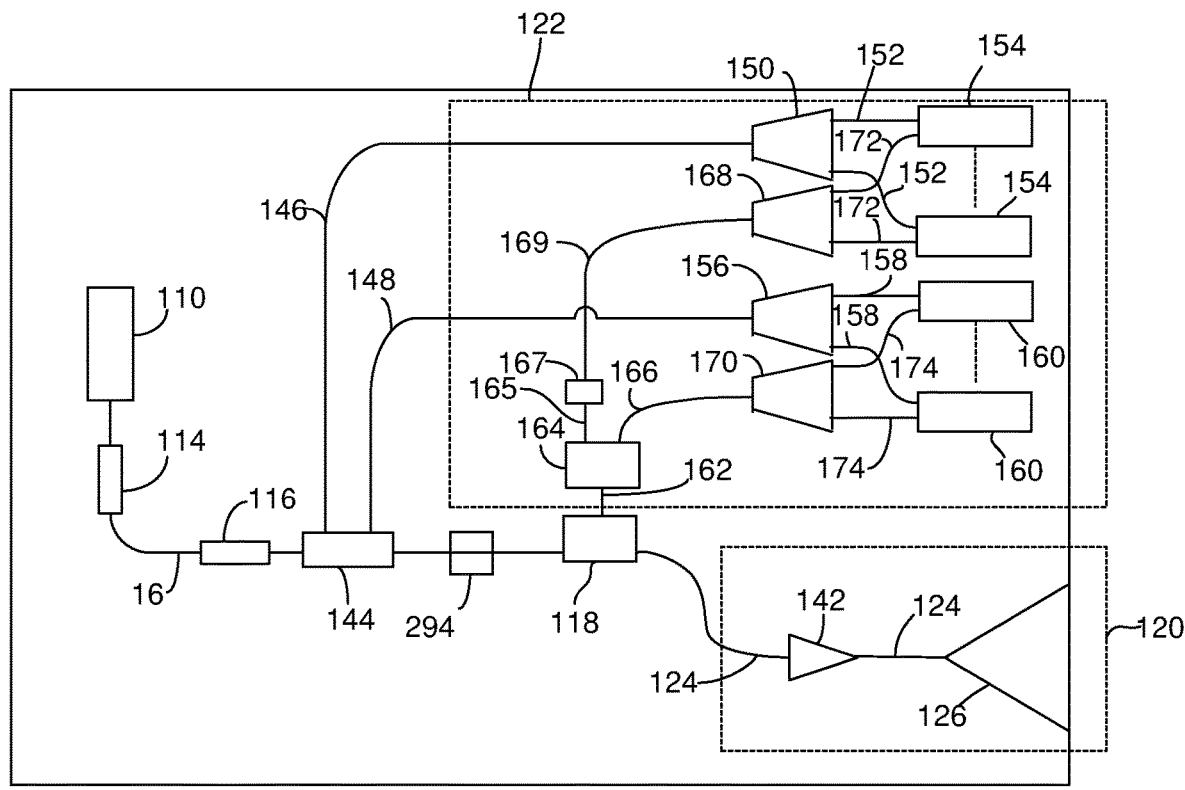
FIG. 4 is a schematic of another embodiment of a LIDAR system.
Figure 4:
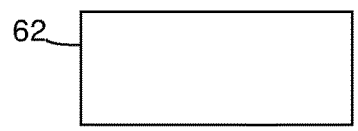

FIG. 4 is a schematic of the LIDAR system of FIG. 3A and/or FIG. 3B modified to compensate for changes in the polarization of the LIDAR output signal. A tap component 144 is positioned along the utility waveguide 16. The tap component 144 is configured to tap off a first portion of the outgoing light signal such that the first portion of the outgoing light signal is received on a first reference signal waveguide 146. The first portion of the outgoing light signal received by the first reference signal waveguide 146 serves as a first reference light signal. The tap component 144 is also configured to tap off a second portion of the outgoing light signal such that the second portion of the outgoing light signal is received on a second reference signal waveguide 148. The second portion of the outgoing light signal received by the second reference signal waveguide 148 serves as a second reference light signal.

The first reference signal waveguide 146 carries the first reference light signal to a first reference demultiplexer 150. When the first reference light signal includes multiple channels, the first reference demultiplexer 150 divides the first reference light signal into different first reference signals that each has a different wavelength. The first reference demultiplexer 150 outputs the first reference signals on different first reference waveguides 152. The first reference waveguides 152 each carry one of the first reference signals to one of several first processing components 154.

The second reference signal waveguide 148 carries the second reference light signal to a second reference demultiplexer 156. When the second reference light signal includes multiple channels, the second reference demultiplexer 156 divides the second reference light signal into different second reference signals that each has a different wavelength. The second reference demultiplexer 156 outputs the second reference signals on different second reference waveguides 158. The second reference waveguides 158 each carry one of the second reference signals to one of several second processing components 160.

The utility waveguide 16 carries the outgoing light signal to the signal-directing component 118. The signal-directing component 118 directs the outgoing light signal to the LIDAR signal waveguide 124. The LIDAR signal waveguide 124 receives the incoming light signal from the output component 126 and carries the incoming light signal to the signal-directing component 118. The signal-directing component 118 directs the incoming light signal to an intermediate waveguide 162. Suitable signal-directing components 118 include, but are not limited to, circulators, 2×2 optical couplers, 1×2 optical couplers, and switches.

The intermediate waveguide 162 carries the received portion of the incoming light signal to a beamsplitter 164. The beamsplitter 164 splits the beam into a precursor comparative incoming signal and a second comparative incoming signal. The precursor comparative incoming signal is received on a precursor comparative signal waveguide 165 and the second comparative incoming signal is received on a second comparative signal waveguide 166. The precursor comparative signal waveguide 165 carries the precursor comparative incoming signal to a polarization rotator 167. The polarization rotator outputs a first comparative incoming signal that is received on a first comparative signal waveguide 169. The first comparative signal waveguide 169 carries the first comparative incoming signal to a first comparative demultiplexer 168 and the second comparative signal waveguide 166 carries the second comparative incoming signal to a second comparative demultiplexer 170.

When the first comparative incoming light signal includes multiple channels, the first comparative demultiplexer 168 divides the first comparative incoming light signal into different first comparative signals that each has a different wavelength. The first comparative demultiplexer 168 outputs the first comparative signals on different first comparative waveguides 172. The first comparative waveguides 172 each carry one of the first comparative signals to a different first processing component 154.

When the second comparative light signal includes multiple channels, the second comparative demultiplexer 170 divides the first comparative incoming light signal into different second comparative signals that each has a different wavelength. The second comparative demultiplexer 170 outputs the second comparative signals on different second comparative waveguides 174. The second comparative waveguides 174 each carry one of the second comparative signals to a different second processing component 160.

The first comparative waveguides 172 and the first reference waveguides 152 are configured such that a comparative signal and the corresponding reference signal are received at the same first processing component 154. For instance, the first comparative waveguides 172 and the first reference waveguides 152 are configured such that the first comparative signal and the first reference signal of the same wavelength are received at the same first processing component 154.

The second comparative waveguides 174 and the second reference waveguides 158 are configured such that a comparative signal and the corresponding reference signal are received at the same second processing component 160. For instance, the second comparative waveguides 174 and the second reference waveguides 158 are configured such that the second comparative signal and the second reference signal of the same wavelength are received at the same second processing component 160.

The first processing components 154 each combines a first comparative signal with the corresponding first reference signal to form a first composite signal that carries LIDAR data for a sample region on the field of view. The second processing components 160 each combines a second comparative signal with the corresponding second reference signal to form a second composite signal that carries LIDAR data for a sample region on the field of view.

The LIDAR system is constructed such that the first comparative signals have the same polarization angle as the corresponding second comparative signals. For instance, the beamsplitter 164 can be a polarizing beam splitter. One example of a polarizing beamsplitter is constructed such that the channels in the precursor comparative incoming signal have a first polarization but do not have or do not substantially have a second polarization and the channels in the second comparative incoming signal have a second polarization but do not have or do not substantially have the first polarization. For instance, the polarizing beamsplitter can route a portion of the incoming light signal having the first polarization to the precursor comparative signal waveguide 165 and a portion of the incoming light signal having the second polarization to the second comparative signal waveguide 166. The first polarization and the second polarization can be linear polarities and the second polarization is different from the first polarization. For instance, the first polarization can be TE and the second polarization can be TM or the first polarization can be TM and the second polarization can be TE. Suitable beamsplitters include, but are not limited to, Wollaston prisms, MEMs-based polarizing beamsplitters and integrated optical polarizing beamsplitters using asymmetric y-branches, Mach-Zehnder interferometers and multi-mode interference couplers.

The polarization rotator can be configured to change the polarization of the channels in the precursor comparative incoming signal from the first polarization to the second polarization. As a result, the channels in the first comparative incoming signal have the second polarization but do not have or do not substantially have the first polarization. Accordingly, the channels in the first comparative incoming signal and the corresponding channels in the second comparative incoming signal each have the same polarization (the second polarization in this discussion). The first comparative signals that result from the first comparative incoming signal have the same polarization angle as the corresponding second comparative signals that result from the second comparative incoming signal. Suitable polarization rotators include, but are not limited to, rotation of polarization-maintaining fibers, Faraday rotators, half-wave plates, MEMs-based polarization rotators and integrated optical polarization rotators using asymmetric y-branches, Mach-Zehnder interferometers and multi-mode interference couplers.

Since the LIDAR output signal(s) are linearly polarized, the first reference signals can have the same linear polarization angle as the corresponding second reference signals. For instance, the first reference signals and the second reference signals can each have the same polarization as the first comparative incoming signal and the second comparative incoming signal. Accordingly, the first comparative signals, the second comparative signals, the first reference signals, and the second reference signals can each have the same polarization. In this example, the first comparative signals, the second comparative signals, the first reference signals, and the second reference signals can each have light of the second polarization.

As a result of the above configuration, the first composite signals each results from combining a reference signal and a comparative signal of the same polarization and will accordingly provide the desired beating between the reference signal and the comparative signal. For instance, the first composite signals each results from combining a reference signal and a comparative signal of the first polarization and excludes or substantially excludes light of the second polarization or the first composite signals each results from combining a reference signal and a comparative signal of the second polarization and excludes or substantially excludes light of the first polarization. Similarly, the second composite signals each includes a reference signal and a comparative signal of the same polarization will accordingly provide the desired beating between the reference signal and the comparative signal. For instance, the second composite signals each results from combining a reference signal and a comparative signal of the first polarization and excludes or substantially excludes light of the second polarization or the first composite signals each results from combining a reference signal and a comparative signal of the second polarization and excludes or substantially excludes light of the first polarization.

The above configuration results in the LIDAR data for a single sample region in the field of view being present in multiple different composite signals (i.e. the first composite signals and the second composite signal) generated for the sample region. In some instances, determining the LIDAR data for the sample region includes the electronics combining the LIDAR data from different composite signals (i.e. the first composite signals and the second composite signal). Combining the LIDAR data can include taking an average, median, or mode of the LIDAR data generated from multiple different composite signals. For instance, the electronics can average the distance between the source of a LIDAR output signal and the reflecting object determined from the first composite signal with the distance determined from the second composite signal and/or the electronics can average the radial velocity between the source of a LIDAR output signal and the reflecting object determined from the first composite signal with the radial velocity determined from the second composite signal.

In some instances, determining the LIDAR data for a sample region includes the electronics identifying one or more composite signals (i.e. the first composite signal and/or the second composite signal) as the source of the LIDAR data that is most represents reality (the representative LIDAR data). The electronics can then use the LIDAR data from the identified composite signal as the representative LIDAR data to be used for additional processing. For instance, the electronics can identify the signal (first composite signal or the second composite signal) with the larger amplitude as having the representative LIDAR data and can use the LIDAR data from identified signal for further processing by the LIDAR system. In some instances, the electronics combine identifying the composite signal with the representative LIDAR data with combining LIDAR data from different LIDAR signals. For instance, the electronics can identify each of the composite signals with an amplitude above an amplitude threshold as having representative LIDAR data and when more than two composite signals are identified as having representative LIDAR data, the electronics can combine the LIDAR data from each of identified composite signals. When one composite signal is identified as having representative LIDAR data, the electronics can use the LIDAR data from that composite signal as the representative LIDAR data. When none of the composite signals is identified as having representative LIDAR data, the electronics can discard the LIDAR data for the sample region associated with those composite signals.

Although FIG. 4 is described in the context of components being arranged such that the first comparative signals, the second comparative signals, the first reference signals, and the second reference signals each have the second polarization, other configurations of the components in FIG. 4 can arranged such that the first composite signals result from combining a reference signal and a comparative signal of the same linear polarization and the first composite signals result from combining a reference signal and a comparative signal of the same linear polarization. For instance, the polarization rotator can be positioned along the first reference signal waveguide 146 rather than between the precursor comparative signal waveguide 165 and the first comparative signal waveguide 169. As another example, when the first reference signals and the second reference signals each has the first polarization, the polarization rotator can be positioned along the second comparative signal waveguide 166.

The above system configurations result in the first portion of the LIDAR input signal (portion with the first polarization) and the first portion of the LIDAR input signal (portion with the second polarization) being directed into different composite signals. For instance, the system configuration can result in the first composite signals including more of the power from the first portion of the LIDAR input signal than the first composite signals and the second composite signals including more of the power from the second portion of the LIDAR input signal than the first composite signals. Alternately, the system configuration results in the first composite signals including more of the power from the second portion of the LIDAR input signal than the first composite signals and the second composite signals including more of the power from the first portion of the LIDAR input signal than the first composite signals. In some instances, the first portion of the LIDAR input signal has zero power or substantially zero power or the second portion of the LIDAR input signal has zero power or substantially zero power.

Although the LIDAR chips of FIG. 3A through FIG. 4 are disclosed in the context of generating multiple LIDAR output signals, the LIDAR chips of FIG. 3A through FIG. 4 can be configured and/or operated so as to generate or output one LIDAR output signal. For instance, the light sources 110 can output a single channel.

Figure 5:
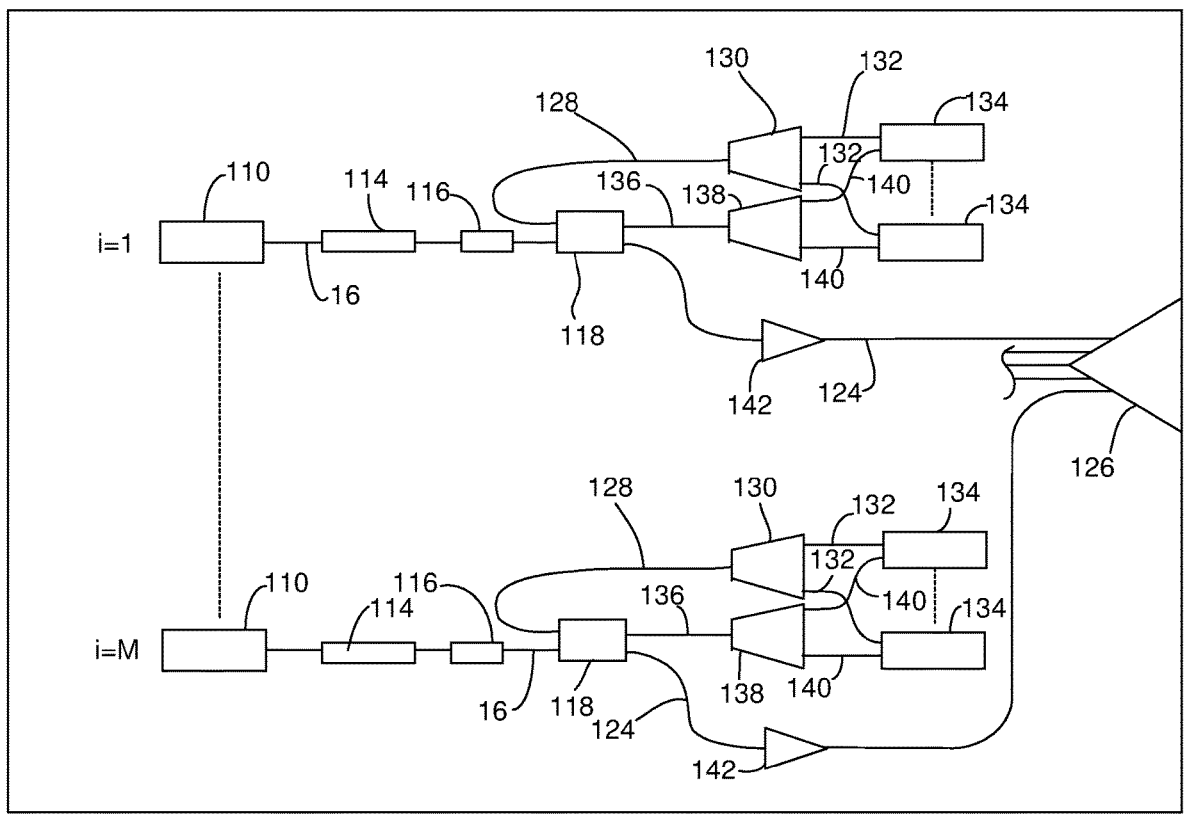
FIG. 5 is a schematic of another embodiment of a LIDAR system.

The above LIDAR systems can include more than one data branch associated with a LIDAR branch. For instance, the LIDAR system of FIG. 5 illustrates a LIDAR system where multiple light sources 110 provide channels to a LIDAR branch and multiple data branches receive light signals from the LIDAR branch.

Figure 6:
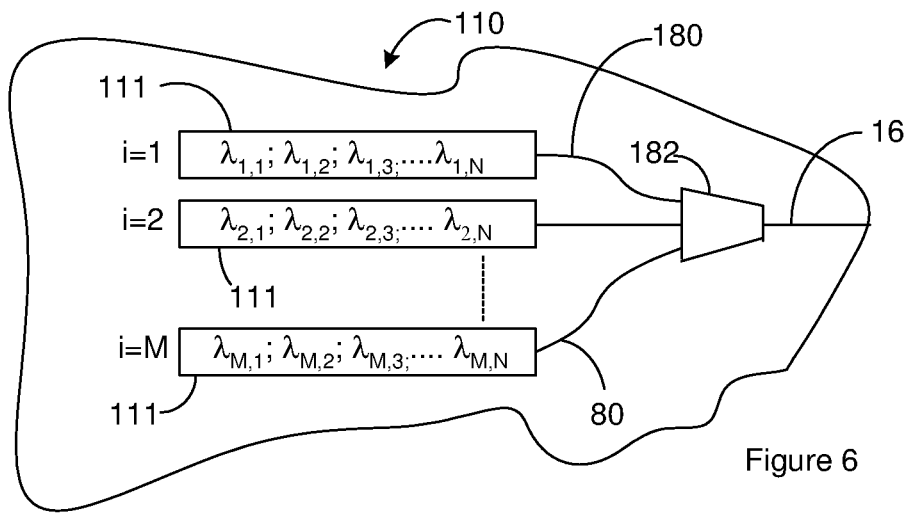
FIG. 6 illustrates multiple light sources configured to generate an outgoing light signal that includes multiple channels.

Although the above LIDAR systems are illustrated as having a single light source 110 in each component assembly, the light source 110 can include multiple light sources. For instance, FIG. 6 illustrates a light source 110 that includes M light sub-sources 111 that each generates N channels. The channels are each received on a channel waveguide 180. The channel waveguides carry the channels to a channel multiplexer 182 that combines the channels so as to form the outgoing light signal that is received on the utility waveguide 16.

In FIG. 6, each of the channels is labeled $\lambda_{i,j}$ where i is the number of the light sub-source 111 and is from 1 to M and j is the number of the channel for light sub-source j and is from 1 to N. As noted above, the light sub-sources 111 can be configured such that the wavelengths of the channels are periodically spaced in that the wavelength increase from one channel to the next channel ($\Delta\lambda$) is constant or substantially constant. In some instances, the light sub-sources 111 are configured such that channels with adjacent wavelengths are generated by different light sub-sources 111. For instance, the light sub-sources 111 can be configured such that $\lambda_{i,j}=\lambda_o+((i-1)+(j-1)(M))(\Delta\lambda)$. Suitable light sub-sources 111 for this configuration include, but are not limited to, comb lasers. In this configuration, the channel multiplexer can be a cyclic multiplexer designed with the wavelength spacing $((N-1)*\Delta X)$ equal to a multiple of the Free Spectral Range (FSR) of the channel multiplexer. Accordingly, the channel multiplexer can be designed to cycle over the wavelength range $((N-1)*\Delta X)$. A suitable cyclic multiplexer includes, but is not limited to, the 'colorless' AWG from Gemfire (8-Channel Cyclic Arrayed Waveguide Grating, 2018).

Suitable values for the number of light sub-sources 111 (M) include, but are not limited to, values greater than or equal to 2, 4, or 8, and/or less than 16, 32, or 64. Suitable values for the number of channels provided by a light sub-sources 111 (N) include, but are not limited to, values greater than or equal to 2, 4, or 8, and/or less than 16, 32, or 64. Suitable values for the wavelength increase from one channel to the next channel (AX) include, but are not limited to, values greater than or equal to 0.2 nm, 0.4 nm, or 0.6 nm, and/or less than 0.8 nm, 1.0 nm, or 1.5 nm. Suitable values for the wavelength of the channel with the shortest wavelength include, but are not limited to, values greater than or equal to 1.3 µm, 1.4 µm, or 1.5 µm, and/or less than 1.6 µm, 1.7 µm, or 1.8 µm. In one example, the LIDAR system includes M greater than or equal to 2, 4, or 8, and/or less than 16, 32, or 64; N greater than or equal to 2, 4, or 8, and/or less than 16, 32, or 64; and κλ greater than or equal to 0.2 nm, 0.4 nm, or 0.6 nm, and/or less than 0.8 nm, 1 nm, or 1.5 nm.

In some instances, the light sources 110 are configured such that at least a portion of the light sub-sources 111 each generates two or more channels with adjacent wavelengths. For instance, the light sub-sources 111 can be configured such that $\lambda_{i,j}=\lambda_o+((j-1)+(i-1)(N))(\Delta\lambda)$. Suitable light sub-sources 111 for this configuration include, but are not limited to, comb lasers. In this configuration, the channel multiplexer can be a broadband multiplexer with a bandwidth of at least $N\Delta\lambda$. Suitable broadband multiplexers include, but are not limited to, arrayed waveguide gratings (AWG) and thin film filters.

Figure 7:
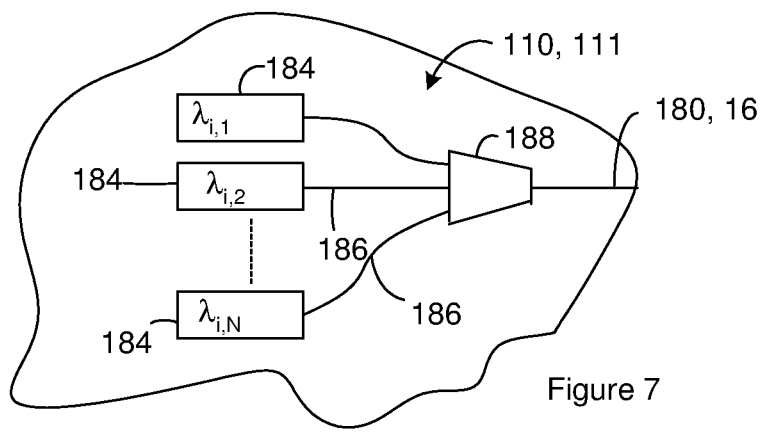
FIG. 7 illustrates a light source that includes multiple laser sources.

As noted above, one or more of the light sources and/or light sub-sources can be a comb laser. However, other constructions of the light source 110 are possible. For instance, FIG. 7 illustrates an example of a light source 110 or light sub-source 111 that includes multiple laser sources 184. The light source 110 or light sub-source 111 illustrated in FIG. 7 includes multiple laser sources 184 that each outputs one of the channels on a source waveguide 186. The source waveguides 186 carry the channels to a laser multiplexer 188 that combines the channels so as to form a light signal that is received on a channel waveguide or the utility waveguide 16. The electronics can operate the laser sources 184 so the laser sources 184 concurrently output each of the channels. Suitable lasers for use with a light source 110 or light sub-source 111 constructed according to FIG. 7 include, but are not limited to, external cavity lasers, distributed feedback lasers (DFBs), and Fabry-Perot (FP) lasers. External cavities lasers are advantageous in this embodiment because of their generally narrower linewidths, which can reduce noise in the detected signal.

Figure 8:
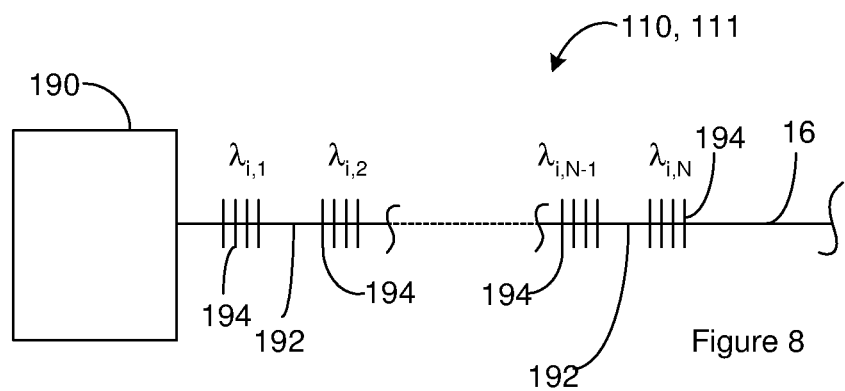
FIG. 8 illustrates one example of a structure configured to generate a light signal that includes multiple channels.

FIG. 8 illustrates another example of a possible light source 110 or light sub-source 111 construction. The light source 110 or light sub-source 111 includes a gain element 190 such as the gain element of a semiconductor laser. A gain waveguide 192 is optically aligned with the gain element so as to receive a light signal from the gain element. In some instances, the gain waveguide excludes the gain medium included in the gain element. For instance, the gain waveguide can be a ridge waveguide on a silicon-on-insulator chip. Multiple partial return devices 194 are positioned along the gain waveguide such that the partial return devices interact with the light signal.

During operation, electronics operate the gain element such that the gain medium outputs the light signal. The partial return devices 194 each passes a portion of the light signal. The portion of the light signal that the utility waveguide 16 receives from the partial return devices serves as the outgoing light signal. The partial return devices also return a portion of the light signal to the gain element such that the returned portion of the light signal travels through the gain element. The gain element can include a fully or partially reflective layer that receives returned portion of the light signal from the gain element and reflects the returned portion of the light signal back to the gain element allowing the returned portion of the light signal to amplify and lase. Accordingly, the light source 110 or light sub-source 111 can be an external cavity laser.

The partial return devices can be configured such that the each partial return device returns a different wavelength of light. For instance, the partial return devices can be configured such that the wavelength of each one of the channels that is to be output by the light source 110 is returned by at least one of the partial return devices. As a result, each of the desired channels will lase and be present in the outgoing light signal. Suitable partial return devices include, but are not limited to, Bragg gratings.

Figure 9A:
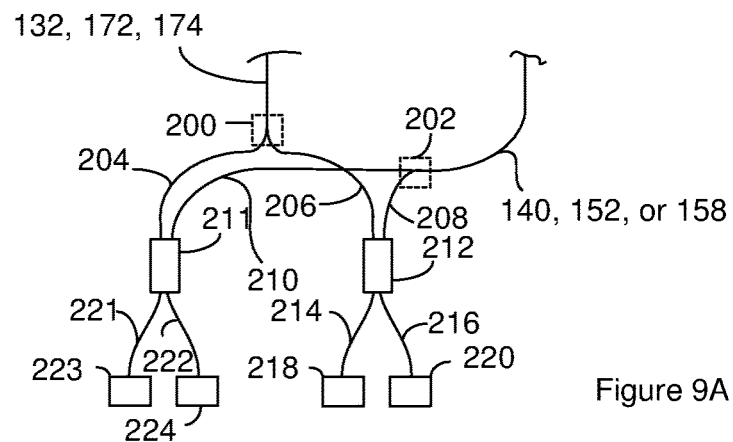
FIG. 9A illustrates an example of a processing unit.
Figure 9B:
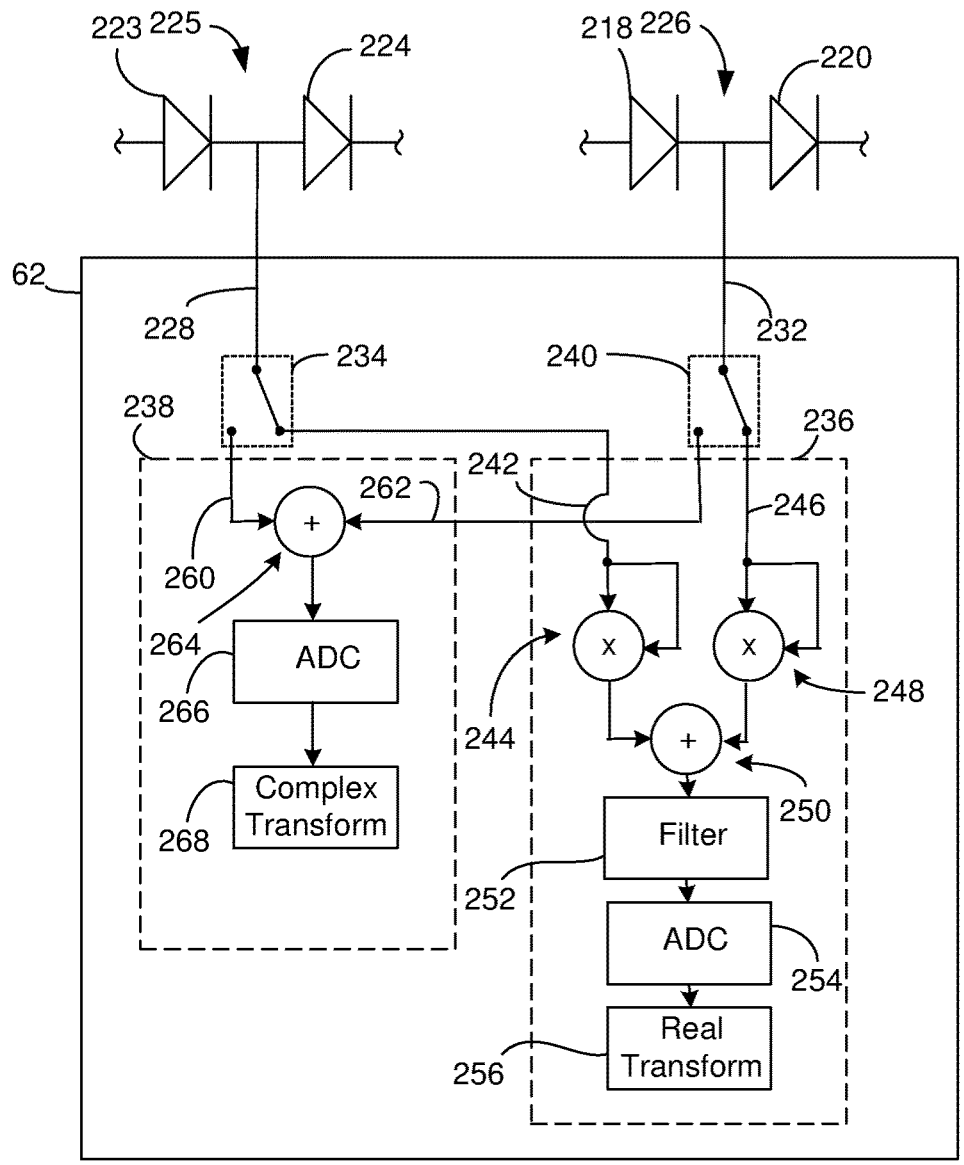
FIG. 9B provides a schematic of electronics that are suitable for use with a processing unit constructed according to FIG. 9A.

All or a portion of the processing components 134 can be constructed and/or operated as disclosed in the context of FIG. 1A. However, the processing components 134 can have other constructions and/or operating principles. As an example, FIG. 9A through FIG. 9B illustrate an example of a suitable processing components 134 for use in the LIDAR chips and/or LIDAR systems. A first splitter 202 divides a reference signal carried on a reference waveguide 27, 140, 152, or 158 onto a first reference waveguide 210 and a second reference waveguide 208. The first reference waveguide 210 carries a first portion of the reference signal to a light-combining component 211. The second reference waveguide 208 carries a second portion of the reference signal to a second light-combining component 212.

A second splitter 200 divides the comparative signal carried on the comparative waveguide 30, 130, 172, or 174 onto a first comparative waveguide 204 and a second comparative waveguide 206. The first comparative waveguide 204 carries a first portion of the comparative signal to the light-combining component 211. The second comparative waveguide 208 carries a second portion of the comparative signal to the second light-combining component 212.

The second light-combining component 212 combines the second portion of the comparative signal and the second portion of the reference signal into a second composite signal. Due to the difference in frequencies between the second portion of the comparative signal and the second portion of the reference signal, the second composite signal is beating between the second portion of the comparative signal and the second portion of the reference signal. The light-combining component 212 also splits the resulting second composite signal onto a first auxiliary detector waveguide 214 and a second auxiliary detector waveguide 216.

The first auxiliary detector waveguide 214 carries a first portion of the second composite signal to a first auxiliary light sensor 218 that converts the first portion of the second composite signal to a first auxiliary electrical signal. The second auxiliary detector waveguide 216 carries a second portion of the second composite signal to a second auxiliary light sensor 220 that converts the second portion of the second composite signal to a second auxiliary electrical signal. Examples of suitable light sensors include germanium photodiodes (PDs), and avalanche photodiodes (APDs).

The first light-combining component 211 combines the first portion of the comparative signal and the first portion of the reference signal into a first composite signal. Due to the difference in frequencies between the first portion of the comparative signal and the first portion of the reference signal, the first composite signal is beating between the first portion of the comparative signal and the first portion of the reference signal. The light-combining component 211 also splits the first composite signal onto a first detector waveguide 221 and a second detector waveguide 222.

The first detector waveguide 221 carries a first portion of the first composite signal to a first light sensor 223 that converts the first portion of the second composite signal to a first electrical signal. The second detector waveguide 222 carries a second portion of the second composite signal to a second auxiliary light sensor 224 that converts the second portion of the second composite signal to a second electrical signal. Examples of suitable light sensors include germanium photodiodes (PDs), and avalanche photodiodes (APDs).

The first reference waveguide 210 and the second reference waveguide 208 are constructed to provide a phase shift between the first portion of the reference signal and the second portion of the reference signal. For instance, the first reference waveguide 210 and the second reference waveguide 208 can be constructed so as to provide a 90 degree phase shift between the first portion of the reference signal and the second portion of the reference signal. As an example, one reference signal portion can be an in-phase component and the other a quadrature component. Accordingly, one of the reference signal portions can be a sinusoidal function and the other reference signal portion can be a cosine function. In one example, the first reference waveguide 210 and the second reference waveguide 208 are constructed such that the first reference signal portion is a cosine function and the second reference signal portion is a sine function. Accordingly, the portion of the reference signal in the second composite signal is phase shifted relative to the portion of the reference signal in the first composite signal, however, the portion of the comparative signal in the first composite signal is not phase shifted relative to the portion of the comparative signal in the second composite signal.

The first light sensor 223 and the second light sensor 224 can be connected as a balanced detector and the first auxiliary light sensor 218 and the second auxiliary light sensor 220 can also be connected as a balanced detector. For instance, FIG. 9B provides a schematic of the relationship between the electronics, the first light sensor 223, the second light sensor 224, the first auxiliary light sensor 218, and the second auxiliary light sensor 220. The symbol for a photodiode is used to represent the first light sensor 223, the second light sensor 224, the first auxiliary light sensor 218, and the second auxiliary light sensor 220 but one or more of these sensors can have other constructions. In some instances, all of the components illustrated in the schematic of FIG. 9B are included on the LIDAR system. In some instances, the components illustrated in the schematic of FIG. 9B are distributed between the LIDAR system and electronics located off of the LIDAR system.

The electronics connect the first light sensor 223 and the second light sensor 224 as a first balanced detector 225 and the first auxiliary light sensor 218 and the second auxiliary light sensor 220 as a second balanced detector 226. In particular, the first light sensor 223 and the second light sensor 224 are connected in series. Additionally, the first auxiliary light sensor 218 and the second auxiliary light sensor 220 are connected in series. The serial connection in the first balanced detector is in communication with a first data line 228 that carries the output from the first balanced detector as a first data signal. The serial connection in the second balanced detector is in communication with a second data line 232 that carries the output from the first balanced detector as a second data signal. The first data signal and the second data signal are beating as a result of the beating between the comparative signal and the reference signal, i.e. the beating in the first composite signal and in the second composite signal.

The first data line 228 carries the first data signal to a first switch 234. The first switch can be in a first configuration where the first data signal is carried to a distance branch 136 or in a second configuration where the first data signal is carried to a velocity branch 238. In FIG. 9B, the first switch 234 is shown in the first configuration. The second data line 232 carries the second data signal to a second switch 240. The second switch can be in a first configuration where the second data signal is carried to the distance branch 236 or in a second configuration where the second data signal is carried to a velocity branch 238. In FIG. 9B, the second switch 240 is shown in the first configuration. A suitable switch for use as the first switch and/or second switch includes, but is not limited to, an electromechanical switch, and a solid state MOSFET or PIN diode switch.

The electronics operate the first switch and the second switch such that they are in the same configuration during the first period and during the second period. For instance, the electronics can operate the first switch and the second switch such that the first switch and the second switch are both in the first configuration during the first period and both in the second configuration during the second period. In this example, the first data signal and the second data signal are carried to the distance branch 236 during the first period and to the velocity branch 238 during the second period.

During operation of the LIDAR system, the generation of LIDAR data is divided into a series of cycles where LIDAR data is generated for each cycle. In some instances, each of the cycles corresponds to a different sample region in the field of view. Accordingly, different cycles can generate LIDAR data for different sample regions in a field of view.

The cycles can be performed such that the time for each cycle can be divided into different time periods that include a distance time period (first period) and a velocity time period (second period). The distance between the reflecting object and the LIDAR chip can be determined in the distance period and the radial velocity between the reflecting object and the LIDAR chip can be determined in the velocity period.

The electronics are configured to use the first data signal and the second data signal to determine or approximate at least the distance between the LIDAR system and the reflecting object. For instance, during the first period, the electronics can operate the modulator 114 so as to add chirp to the amplitude of the outgoing LIDAR signal and accordingly the LIDAR output signal. Adding chirp to the amplitude can include modulating the amplitude of the outgoing LIDAR signal such that the amplitude of the outgoing LIDAR signal is a function of a sinusoid. In one example, the amplitude of the outgoing LIDAR signal is modulated such that the amplitude of the outgoing LIDAR signal is a square root of a function that includes a sinusoid and/or is a square root of a sinusoid. For instance, the outgoing LIDAR signal can be modulated so as to produce a modulated outgoing LIDAR signal and LIDAR output signal mathematically represented by Equation 1: $(M+N*\cos(C*t+D*t^2))^{1/2} \cos(F*t)$ where M, N, C, D and F are constants, t represents time, $M > 0$, $N > 0$, and $M > N$ in order to prevent the radicand from becoming negative, $C > 0$, $D \neq 0$. As will become evident below, F can be a function of the frequency of the LIDAR output signal ($f_c$). In Equation 1, F and C can be selected such that $F \gg C$.

The distance branch includes a first distance branch line 242. During the first period, the first distance branch line 242 carries the first data signal to a first multiplier 244. In FIG. 9B, the first multiplier 244 is configured to square the amplitude of the first data signal and to output a first multiplied data signal. The distance branch includes a second distance branch line 246. During the first period, the second distance branch line 246 carries the second data signal to a second multiplier 248. In FIG. 9B, the second multiplier 248 is configured to square the amplitude of the second data signal and to output a second multiplied data signal. Suitable first multipliers and/or second multipliers include, but are not limited to, RF mixers such as a Gilbert cell mixer.

The distance branch includes an adder 250 that sums the first multiplied data signal and the second multiplied data signal. The adder outputs a summed data signal. Suitable adders include, but are not limited to, RF combiners including resistive or hybrid combiners. The distance branch includes a low-pass filter 252 that receives the summed data signal and outputs a beating data signal. The low-pass filter is selected to remove higher frequency contributions to the summed data signal that are artifacts of the mixing of the reference and return signals. The low-pass filter can be selected to have a bandwidth greater than or equal to: $f_{dmax}/2 + \alpha\tau_{0max}$ where $f_{dmax}$ represents the maximum level of the Doppler shift of the LIDAR input signal relative to the LIDAR input signal for which the LIDAR system is to provide reliable results, $\tau_{0max}$ represents maximum delay between transmission of the LIDAR output signal and the receipt of the LIDAR input signal, and a represents the rate of change in the frequency of the chirp added to the amplitude of the modulated outgoing LIDAR signal during the duration of the sample period (i.e. the first period). In some instances, a is determined from B/T where B represents the change in the frequency of the chirp added to the amplitude of the modulated outgoing LIDAR signal during the duration of the sample period and T is the duration of the sample period. In some instances, T is determined from:

$$T = \frac{\lambda_c}{2\Delta v_{min}} + \tau_{0max}$$

where $\lambda_C$, represents the wavelength of the outgoing LIDAR signal, $\Delta v_{min}$: represents velocity resolution and B can be determined from $$B = \frac{cT}{2(T - \tau_{0max})\Delta R_{min}}$$

where c represents the speed of light and $\Delta R_{min}$ represents distance resolution. In some instances, the filter has a bandwidth greater than 0.1 GHz, 0.2 GHz, or 0.3 GHz and/or less than 0.4 GHz, 0.5 GHz, or 1 GHz. Corresponding values for the sweep period (T) can be 10 µs, 8 µs, 4 µs, 3 µs, 2 µs, and 1 µs.

The distance branch includes an Analog-to-Digital Converter (ADC) 254 that receives the beating data signal from the filter. The Analog-to-Digital Converter (ADC) 254 converts the beating data signal from an analog form to digital form and outputs the result as a digital LIDAR data signal. As discussed above, the conversion of the beating data signal includes sampling the beating data signal at a sampling rate. The addition of the chirp to the amplitude of the LIDAR output signal substantially reduces or removes the effects of radial velocity from the beating of the composite signal and the resulting electrical signals. For instance, the frequency shift of the LIDAR output signal relative to the LIDAR input signal ("frequency shift," Δf) can be written as $\Delta f = \Delta f_d + \Delta f_s$ where $\Delta f_d$ represents the change in frequency due to the Doppler shift and $\Delta f_s$ is the change in frequency due to the separation between the reflecting object and the LIDAR system. The outgoing LIDAR signal can be modulated so as to produce a modulated outgoing LIDAR signal and accordingly, a LIDAR output signal that is also modulated, where the change in frequency due to the Doppler shift ($\Delta f_d$) is less than 10%, 5%, 1%, or even 0.1% of the Doppler shift that would occur from a sinusoidal LIDAR output signal serving as the LIDAR and having a constant amplitude and the same frequency as the modulated outgoing LIDAR signal and/or the LIDAR output signal. For instance, the outgoing LIDAR signal and/or the LIDAR output signal can be modulated so as to produce a modulated outgoing LIDAR signal and/or a LIDAR output signal where the change in frequency due to the Doppler shift ($\Delta f_d$) is less than 10%, 5%, 1%, or even 0.1% of the Doppler shift that would occur from a continuous wave serving as the LIDAR output signal and having the same frequency as the modulated outgoing LIDAR signal and/or the LIDAR output signal. In another example, the outgoing LIDAR signal and/or the LIDAR output signal are modulated so as to produce a modulated outgoing LIDAR signal and/or a LIDAR output signal where the change in frequency due to the Doppler shift ($\Delta f_d$) is less than 10%, 5%, 1%, or even 0.1% of the Doppler shift that would occur from the outgoing LIDAR signal before modulation (the unmodulated outgoing LIDAR signal) serving as the LIDAR output signal. These results can be achieved by increasing the value of the Equation 1 variable F relative to C. For instance, F can represent $2\pi f_c$ and C can represent $2\pi f_1$ where $f_1$ denotes the base frequency of the frequency-chirp in the amplitude of the modulated outgoing LIDAR signal. Accordingly, F can be increased relative to C by increasing the value of the frequency of the LIDAR output signal ($f_c$) relative to the chirp base frequency ($f_1$). As an example, $f_c$ and $f_1$ can be selected such that $f_c \gg f_1$. In some instances, $f_c$ and $f_1$ are selected such that a ratio of $f_c$: $f_1$ is greater than 2: 1, 10: 1, $1\times10^4$: 1, $5\times10^4$, or $1\times10^5$:1 and/or less than $5\times10^5$, $1\times10^6$, $5\times10^6$ or $5\times10^8$. Accordingly, the variables F and C can also have these same values for a ratio of F:C. The reduction and/or removal of the change in frequency due to the Doppler shift ($\Delta f_d$) from the frequency shift lowers the beat frequency and accordingly reduces the required sampling rate.

The distance branch includes a transform module 256 that receives the digital LIDAR data signal from the Analog-to-Digital Converter (ADC) 254. The transform module 256 is configured to perform a real transform on the digital LIDAR data signal so as to convert from the time domain to the frequency domain. This conversion provides an unambiguous solution for the shift in frequency of the shift of the LIDAR input signal relative to the LIDAR input signal that is caused by the distance between the reflecting object and the LIDAR system. A suitable real transform is a Fourier transform such as a Fast Fourier Transform (FFT). The classification of the transform as a real transform distinguishes the transform from complex transforms such as complex Fourier transforms. The transform module can execute the attributed functions using firmware, hardware or software or a combination thereof.

Since the frequency provided by the transform module does not have input from, or does not have substantial input from, a frequency shift due to relative movement, the determined frequency shift can be used to approximate the distance between the reflecting object and the LIDAR system. For instance, the electronics can approximate the distance between the reflecting object and the LIDAR system ($R_0$) using Equation 3: $R_0 = c^* \Delta f/(2\alpha)$ where $\Delta f$ can be approximated as the peak frequency output from the transform module, and c is the speed of light.

The velocity branch can be configured to use the first data signal and the second data signal to determine or approximate at least the radial velocity of the LIDAR system and the reflecting object. The LIDAR output signal with a frequency that is a function of time disclosed in the context of FIG. 3A through FIG. 4 can be replaced by a LIDAR output signal where the frequency of the LIDAR output signal is not a function of time. For instance, the LIDAR output signal can be a continuous wave (CW). For instance, during the second period, the modulated outgoing LIDAR signal, and accordingly the LIDAR output signal, can be an unchirped continuous wave (CW). As an example the modulated outgoing LIDAR signal, and accordingly the LIDAR output signal, can be represented by Equation 2: $G^*\cos(H^*t)$ where G and H are constants and t represents time. In some instances, G represents the square root of the power of the outgoing LIDAR signal and/or H represents the constant F from Equation 1. In instances where the output of the light source has the waveform that is desired for the modulated outgoing LIDAR signal, the electronics need not operate the modulator 114 so as to modify the outgoing LIDAR signal. In these instances, the output of the light source(s) can serve as the modulated outgoing LIDAR signal and accordingly the LIDAR output signal. In some instances, the electronics operate the modulator 114 so as to generate a modulated outgoing LIDAR signal with the desired form.

Since the frequency of the LIDAR output signal is constant in the second period, changing the distance between reflecting object and LIDAR system does not cause a change to the frequency of the LIDAR input signal. As a result, the separation distance does not contribute to the shift in the frequency of the LIDAR input signal relative to the frequency of the LIDAR output signal. Accordingly, the effect of the separation distance has been removed or substantially from the shift in the frequency of the LIDAR input signal relative to the frequency of the LIDAR output signal.

The velocity branch includes a first velocity branch line 260 and a second velocity branch line 260. During the second period, the first velocity branch line 260 carries the first data signal to an Analog-to-Digital Converter (ADC) 164 which converts the first data signal from an analog form to a digital form and outputs a first digital data signal. As discussed above, the conversion of the first data signal is done by sampling the first data signal at a sampling rate. The use of a continuous wave as the LIDAR output signal substantially removes the effects of distance between the reflecting object and LIDAR system from the beating of the composite signal and the resulting electrical signals. Accordingly, the beating frequency is reduced and the required sampling rate is reduced.

The second velocity branch line 262 carries the second data signal to an Analog-to-Digital Converter (ADC) 266 which converts the second data signal from an analog form to a digital form and outputs a second digital data signal. As discussed above, the conversion of the second data signal includes sampling the second data signal at a sampling rate. The use of a continuous wave as the LIDAR output signal substantially reduces or removes the effects of distance between the reflecting object and LIDAR system from the beating of the second composite signal and the resulting electrical signals. Accordingly, the beating frequency is reduced and the required sampling rate is reduced.

The sampling rate for the Analog-to-Digital Converter (ADC) 264 can be the same or different from the sampling rate for the Analog-to-Digital Converter (ADC) 266.

The velocity branch includes a transform module 268 that receives the first digital data signal from the Analog-to-Digital Converters (ADC) 264 and the second digital data signal from the Analog-to-Digital Converters (ADC) 266. Since the first data signal is an in-phase component and the second data signal its quadrature component, the first data signal and the second data signal together act as a complex velocity data signal where the first data signal is the real component and the second data signal is the imaginary component. As a result, the first digital data signal can be the real component of a digital velocity data signal and the second data signal can be the imaginary component of the digital velocity data signal. The transform module 168 can be configured to perform a complex transform on the digital velocity data signal so as to convert from the time domain to the frequency domain. This conversion provides an unambiguous solution for the shift in frequency of LIDAR input signal relative to the LIDAR input signal that is caused by the radial velocity between the reflecting object and the LIDAR system. A suitable complex transform is a Fourier transform such as a complex Fast Fourier Transform (FFT).

The transform module can execute the attributed functions using firmware, hardware or software or a combination thereof.

Since the frequency shift provided by the transform module 268 does not have input from a frequency shift due to the separation distance between the reflecting object and the LIDAR system, and because of the complex nature of the velocity data signal, the output of the transform module 268 can be used to approximate the radial velocity between the reflecting object and the LIDAR system. For instance, the electronics can approximate the radial velocity between the reflecting object and the LIDAR system (v) using Equation 4: $v = c*f_d/(2*f_c)$ where $f_d$ is approximated as the peak frequency output from the transform module 268, c is the speed of light, and $f_c$ represents the frequency of the LIDAR output signal.

Additional components can be added to the schematic of FIG. 9B. For instance, when the LIDAR system generates multiple LIDAR output signals or is used with other LIDAR systems that generate LIDAR output signals (i.e., by means of frequency or wavelength division multiplexing, FDM/WMD), the LIDAR system can include one or more filters to remove interfering signals from the real and/or imaginary components of the beating data signal and/or of the velocity data signal. Accordingly, the LIDAR system can include one or more filters in addition to the illustrated components. Suitable filters include, but are not limited to, lowpass filters. In the case of the optical design, if the frequency of the interfering components fall outside the bandwidth of the balance detector(s), additional filtering may not be necessary as it may be effectively provided by the balance detector(s).

The sampling rate that is used during the first period and the second period can be selected to have a value that is greater than or equal to the larger of two values selected from the group consisting of the minimum sampling rate for the first period and the minimum sampling rate for the second period. For instance, during the first period the range of rates for the first period sampling rate ($f_{s1}$) can be determined by $f_{s1} \geq 2 \times \alpha \tau_{0max}$ where $\tau_{0max}$ represents the maximum amount of time between the transmission of the LIDAR output signal and the receipt of the LIDAR input signal. During the second period the range of rates for the second period sampling rate ($f_{s2}$) can be determined by $f_{s2} \geq 2 \times f_{dmax}$ where $f_{dmax}$ represents the maximum level of the Doppler shift of the LIDAR input signal relative to the LIDAR input signal for which the LIDAR system is to provide reliable results. The maximum is determined by the largest level for which the LIDAR system is to provide reliable results. Accordingly, the maximum distance generally corresponds to the distance for the field of view set in the LIDAR specifications and the maximum Doppler shift generally corresponds to the Doppler shift that would occur at the maximum radial velocity values set in the specifications. These two equations show that the minimum sampling rate for the first period is $2\alpha\tau_{0max}$ and the minimum sampling rate for the second period is $2f_{dmax}$. As a result, the sampling rate is selected to have a value that is greater than or equal to the larger of $2\alpha\tau_{0max}$ and $2f_{dmax}$. In other words, the sample rate used during the first period and the second period ($f_s$) is $f_s \geq \max(2\alpha\tau_{0max}, 2f_{dmax})$. In some instances, the sample rate used during the first period and the second period ($f_s$) is greater than or equal to 0.1 GHz, 0.2 GHz, or 0.5 GHz and/or less than 1 GHz, 2 GHz, or 4 GHZ.

The above description of the LIDAR system operation assumes that a modulator is present on the utility waveguide 16; however, the modulator is optional. In these instances, the electronics can operate the light source 10(s) so as to increase the frequency of the outgoing LIDAR signal during the first period and during the second period the electronics can decrease the frequency of the outgoing LIDAR signal. Suitable methods for extracting the LIDAR data from the resulting composite signals are disclosed in U.S. Patent Application Ser. No. 62/671,913, filed on May 15, 218, entitled "Optical Sensor Chip," and incorporated herein in its entirety.

Figure 9C:
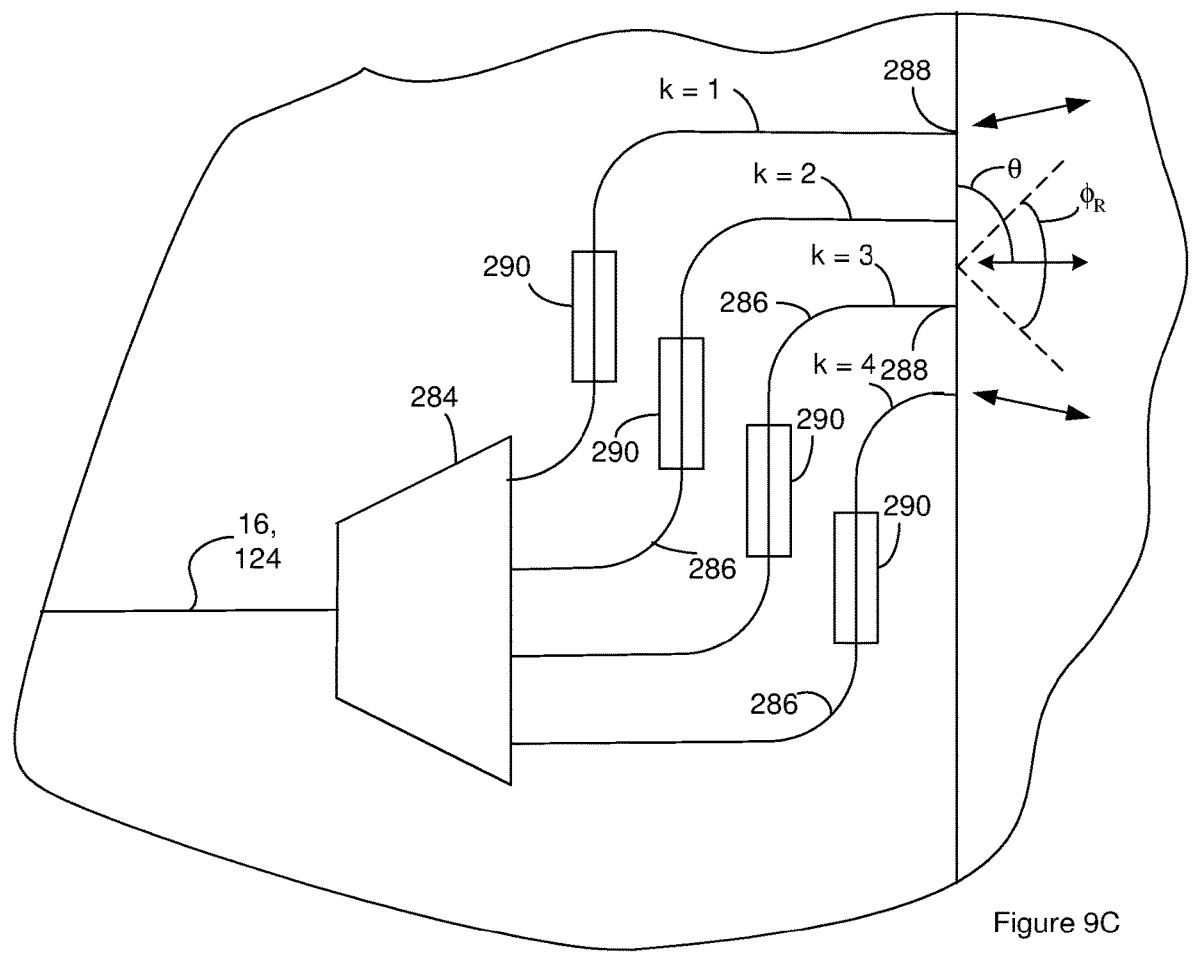
FIG. 9C illustrates an example of an output component that includes beam steering capability.

FIG. 9C illustrates an example of a suitable output component 126 that includes beam steering capability. The output component can be used in conjunction with a LIDAR chip constructed according to FIG. 1 through FIG. 2 and/or according to FIG. 3A through FIG. 5. For instance, the output component 126 includes a splitter 284 that can receive an outgoing light signal from the utility waveguide 16 of FIG. 1 or from one or more LIDAR signal waveguide 124 of FIG. 3A through FIG. 5. The splitter divides the outgoing light signal into multiple output signals that are each carried on a steering waveguide 286. Each of the steering waveguides ends at a facet 288. The facets are arranged such that the output signals exiting the chip through the facets combine to form the LIDAR output signal.

The splitter and steering waveguides can be constructed such that there is not a phase differential between output signals at the facet of adjacent steering waveguides. For instance, the splitter can be constructed such that each of the output signals is in-phase upon exiting from the splitter and the steering waveguides can each have the same length. Alternately, the splitter and steering waveguides can be constructed such that there is a linearly increasing phase differential between output signals at the facet of adjacent steering waveguides. For instance, the steering waveguides can be constructed such that the phase of steering waveguide number j is $f_o+(j-1)f$ where j is an integer from 1 to N and represents the number associated with a steering waveguide when the steering waveguides are sequentially numbered as shown in FIG. 8, f is the phase differential between neighboring steering waveguides when the phase tuners (discussed below) do not affect the phase differential, and $f_o$ is the phase of the output signal at the facet of steering waveguide k=1. Because the channels can have different wavelengths, the values off and $f_o$ can each be associated with one of the channels. In some instances, this phase differential is achieved by constructing the steering waveguides such that the steering waveguides have a linearly increasing length differential. For instance, the length of steering waveguide j can be represented by $1_o+(k-1)\Delta 1$ where k is an integer from 1 to K and represents the number associated with a steering waveguide when the steering waveguides are sequentially numbered as shown in FIG. 9C, $\Delta 1$ is the length differential between neighboring steering waveguide, and $L_o$ is the length of steering waveguide k=1. Because $\Delta 1$ is a different percent of the wavelength of different channels included in the output signals, each of the different LIDAR output signals travels away from LIDAR chip in a different direction ($\theta$). When the steering waveguides are the same length, the value of $\Delta 1$ is zero and the value off is zero. Suitable $\Delta 1$ include, but are not limited to, $\Delta 1$ greater than 0, or 5 and/or less than 10, or 15 μm. Suitable f include, but are not limited to, f greater than $0\pi$, or $7\pi$ and/or less than $157\pi$, or $207\pi$. Suitable N include, but are not limited to, N greater than 10, or 500 and/or less than 1000, or 2000. The splitter 284 need not have demultiplexing functionality. Suitable splitters 284 include, but are not limited to, star couplers, cascaded Y-junctions and cascaded 1×2 MMI couplers.

A phase tuner 290 can optionally be positioned along at least a portion of the steering waveguides. Although a phase tuner is shown positioned along the first and last steering waveguide, these phase tuners are optional. For instance, the LIDAR chip need not include a phase tuner on steering waveguide j=1.

The electronics can be configured to operate the phase tuners so as to create a phase differential between the output signals at the facet of adjacent steering waveguides. The electronics can operate the phase tuners such that the phase differential is constant in that it increases linearly across the steering waveguides. For instance, electronics can operate the phase tuners such that the tuner-induced phase of steering waveguide number k is $(k-1)\alpha$ where k is an integer from 1 to N and represents the number associated with a steering waveguide when the steering waveguides are sequentially numbered as shown in FIG. 9C, $\alpha$ is the tuner-induced phase differential between neighboring steering waveguides. Accordingly, the phase of steering waveguide number k is $f_o+(k-1)f+(k-1)\alpha$. FIG. 8 illustrates the LIDAR chip having only 4 steering waveguides in order to simplify the illustration, however, the LIDAR chip can include more steering waveguides. For instance, the LIDAR chip can include more than 4 steering waveguides, more than 100 steering waveguides, or more than 1000 steering waveguides and/or less than 10000 steering waveguides.

The electronics can be configured to operate the phase tuners so as to tune the value of the phase differential $\alpha$. Tuning the value of the phase differential a changes the direction that the LIDAR output signal travels away from the LIDAR chip ($\theta$). Accordingly, the electronics can scan the LIDAR output signal by changing the phase differential $\alpha$. The range of angles over which the LIDAR output signal can be scanned is $\phi_R$ and, in some instances, extends from $\phi_v$ to $-\phi_v$ with $\phi=0°$ being measured in the direction of the LIDAR output signal when $\alpha=0$. When the value of $\Delta 1$ is not zero, the length differential causes diffraction such that light of different wavelengths travels away from LIDAR chip in different directions ($\theta$). Accordingly, there may be some spreading of the outgoing LIDAR signal as it travels away from the LIDAR chip. Further, changing the level of diffraction changes the angle at which the outgoing LIDAR signal travels away from the LIDAR chip when $\alpha=0°$. However, providing the steering waveguides with a length differential ($\Delta 1 \neq 0$) can simplify the layout of the steering waveguides on the LIDAR chip.

Additional details about the construction and operation of an output component 126 constructed according to FIG. 9C can be found in U.S. Provisional Patent Application Ser. No. 62/680,787, filed on Jun. 5, 2018, and incorporated herein in its entirety.

Figure 10:
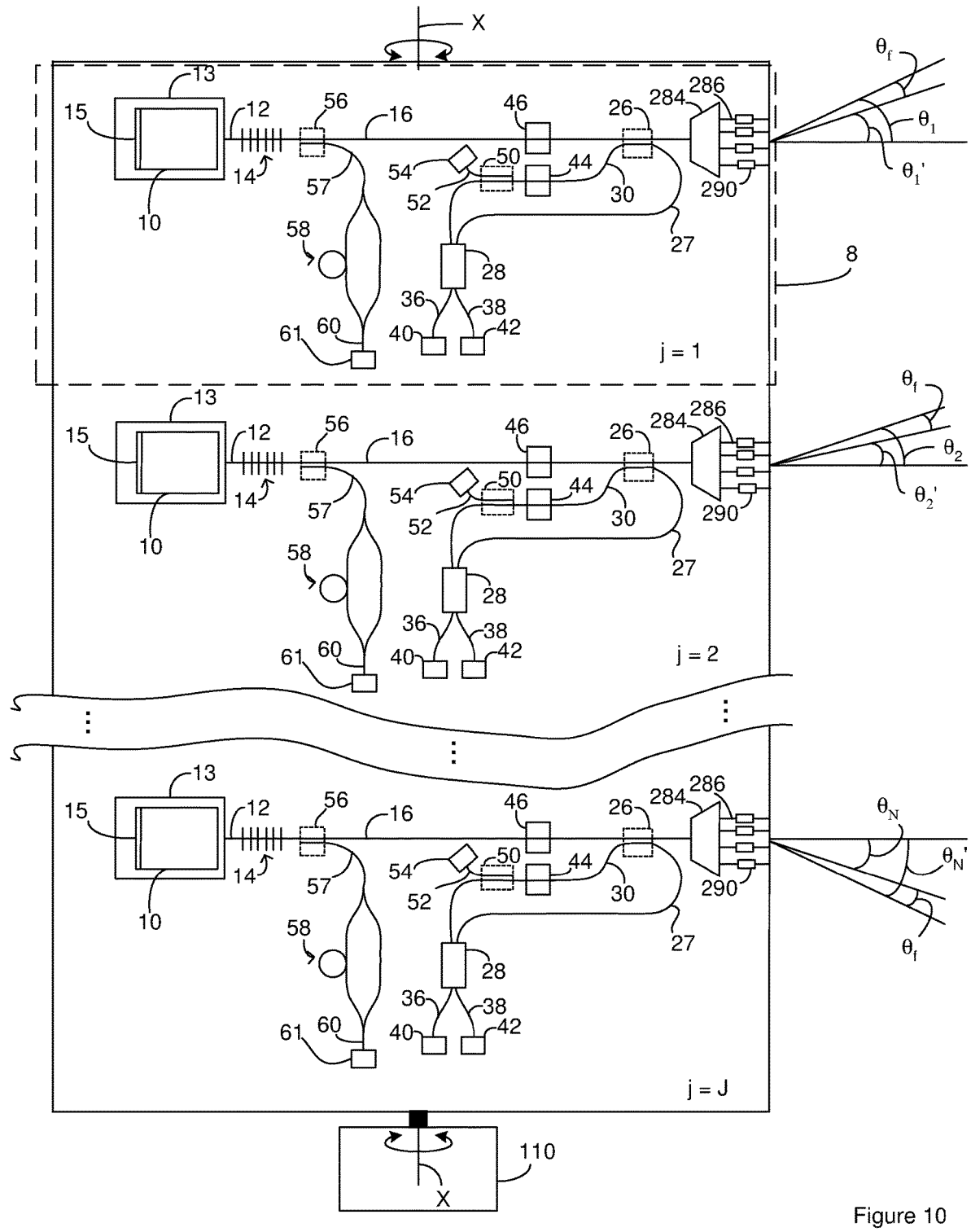
FIG. 10 presents a configuration of a composite LIDAR chip configured to generate multiple LIDAR output signals.

A single LIDAR chip can include multiple component assemblies. For instance, FIG. 10 illustrates a LIDAR chip that serves as a composite LIDAR chip in that the LIDAR chip includes multiple component assemblies labeled j=1 through j=J. The illustrated component assemblies are constructed according to FIG. 1 in conjunction with processing components 134 constructed according to FIG. 9C. The arrangement of the splitter 284, steering waveguides 286, and phase tuners 290 are greatly simplified in FIG. 11 in order to simplify the illustration; however, the component assemblies can include these components arranged and operated as disclosed elsewhere. Each of the component assemblies is operated as disclosed above. Accordingly, each of the component assemblies is configured to generate one or more LIDAR output signals.

Figure 11:
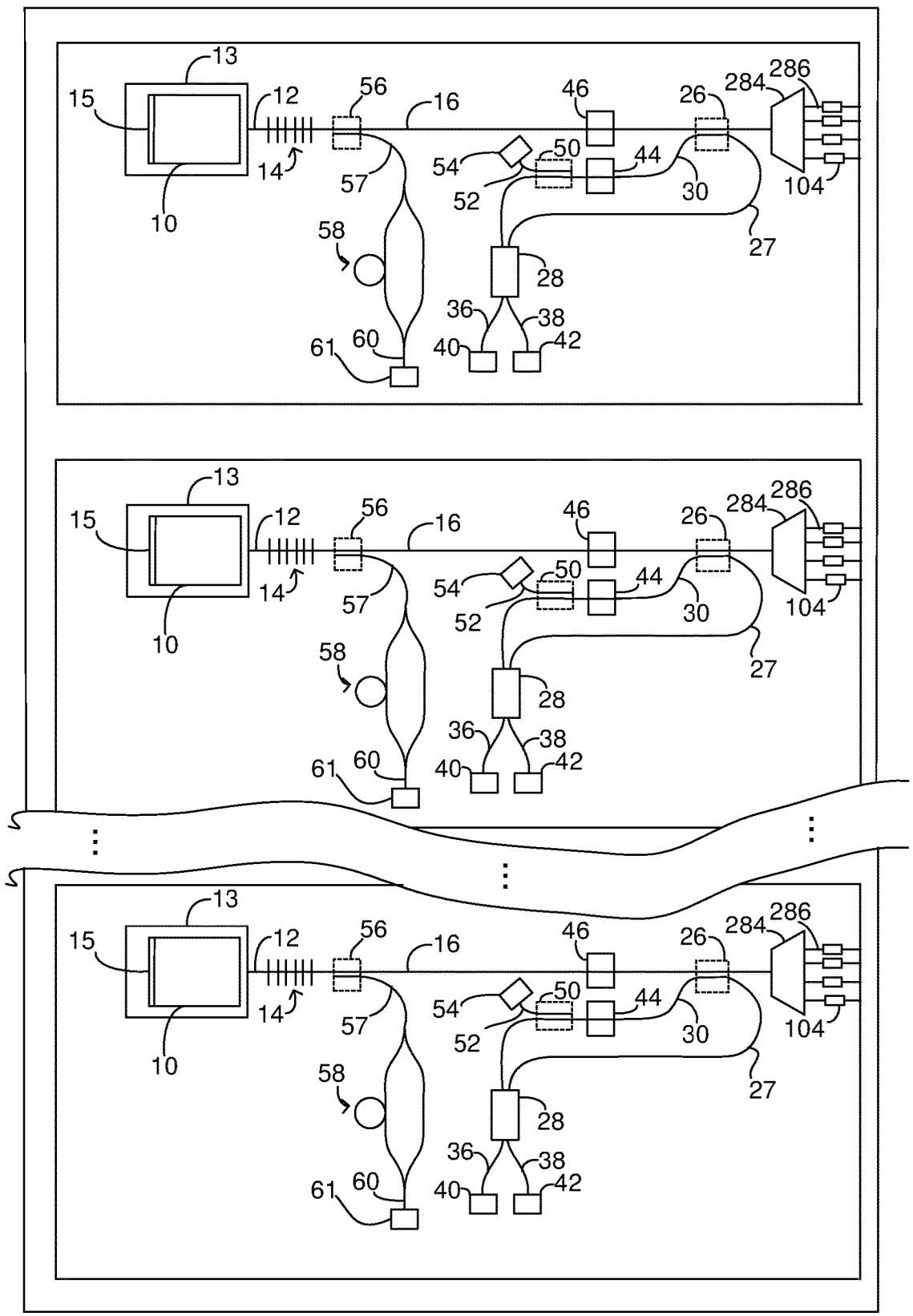
FIG. 11 presents a configuration of a composite LIDAR chip with multiple LIDAR chips on a common substrate.

The LIDAR chip in FIG. 10 shows each of the component assemblies fabricated on the same die. For instance, each of the component assemblies is positioned on the same base or substrate. However, a LIDAR chip that serves as a composite LIDAR chip can be constructed from multiple LIDAR chips that are each fabricated on their own die. The different LIDAR chips can be positioned on a common base or a common substrate as shown in FIG. 11.

The above discussions provide steering of the LIDAR output signals in one dimension. The LIDAR chips can be moved relative to the reflecting object so as to provide scanning in other dimensions. For instance, the LIDAR chips can be rotated around an axis such as the axis labeled X in FIG. 10. The electronics can be in communication with an actuator 292 for moving the composite chip relative to the reflecting object. Examples of suitable actuators include, but are not limited to, electric motors, and piezo-driven rotary actuators. The movement can be controlled so that the LIDAR output signals can be scanned in two dimensions.

Figure 12:
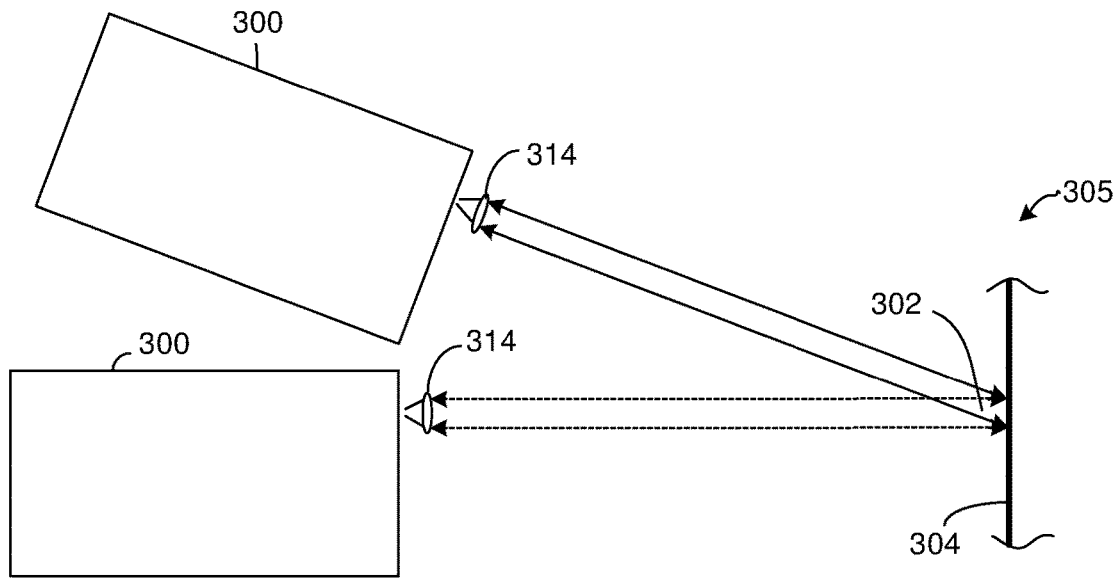
FIG. 12 illustrates multiple LIDAR chips that each outputs a different LIDAR output signal and the LIDAR output signals that are each incident on the same sample region in a field of view.

The LIDAR systems can be configured to provide incident angle diversity where multiple sample regions in the field of view are concurrently illuminated by multiple different LIDAR output signals that each has a different angle of incidence on the sample region and/or on a reflecting object 304 positioned in the sample region. For instance, FIG. 12 illustrates multiple LIDAR chips 300 that each outputs a different LIDAR output signal. One of the LIDAR output signals is illustrated by dashed lines and another of the LIDAR output signals is illustrated with solid lines.

FIG. 12 shows the LIDAR output signals are each directed to the same sample region 302 in a field of view 305. The sample region is located where there is sufficient overlap between the LIDAR output signals for the LIDAR data generated from each of the LIDAR output signals to be representative of the same region of the field of view. Since FIG. 12 illustrates the reflecting object 304 positioned in a sample region 302 that receives the LIDAR output signals, the LIDAR output signals are reflected back toward the LIDAR chips from the sample region in the field of view.

In FIG. 12, the angle of incidence of the LIDAR output signals on the sample region and/or on the reflecting object positioned in the sample region is different. As a result, multiple different LIDAR input signals are generated for the same sample region and each of the different LIDAR input signals is associated with a different angle of incidence. Accordingly, there is an option to generate multiple LIDAR data values for the sample region where each LIDAR data value is associated with a different angle of incidence. In some instances, the different LIDAR output signals have different wavelengths in order to reduce cross-talk.

One or more of the LIDAR chips of FIG. 12 can be configured to steer the LIDAR output signal. For instance, one or more of the LIDAR chips can be constructed according to FIG. 1 through FIG. 5 with an output component 126 constructed according to FIG. 9C and/or with an actuator disclosed in the context of FIG. 10. As a result, the electronics 62 can steer the LIDAR output signals from one sample region in the field of view to other sample region in the field of view. For instance, the electronics 62 can operate each head so as to steer the LIDAR output signal to different sample regions that are different distances from one of both of the LIDAR chips. Accordingly, the sample regions in the field of view can be arranged in one, two, or three dimensions.

Figure 13:
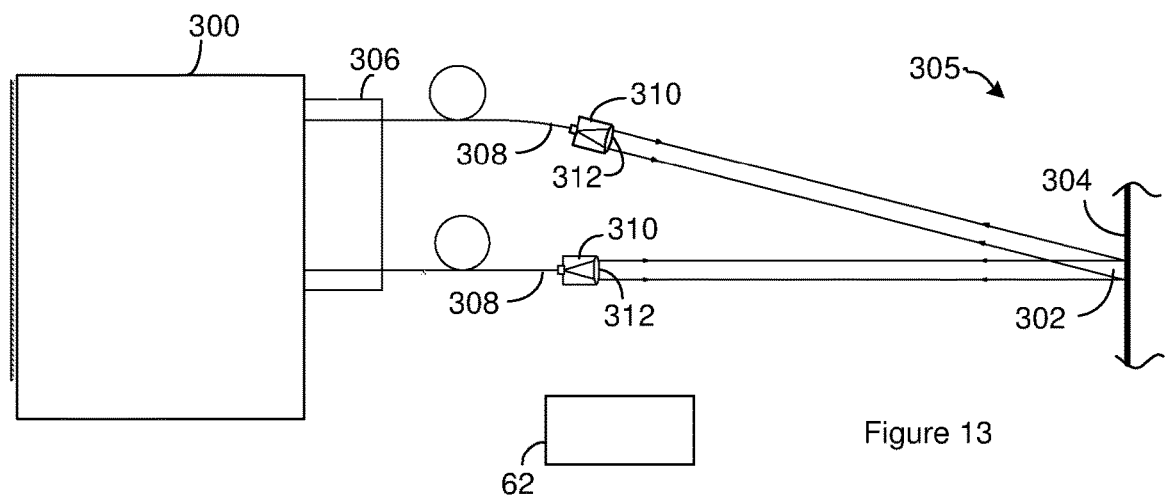
FIG. 13 illustrates a single LIDAR chip that each outputs multiple LIDAR output signals that are each incident on the same sample region in a field of view.

A composite LIDAR chip 300 can also be used to provide incident angle diversity. For instance, FIG. 13 illustrates a composite LIDAR chip configured to output multiple LIDAR output signals that are spaced apart from each other on the composite LIDAR chip. A fiber block 306 attaches multiple optical fibers 308 to the composite LIDAR chip 300. The optical fibers 308 are aligned with the facets on the composite LIDAR chip 300 such that each of the LIDAR output signals is received on one of the optical fibers 308. The optical fibers each carries a LIDAR output signal to a head 310 and a LIDAR input signal from the head to the composite LIDAR chip 300.

The heads 310 are configured to transmit the LIDAR output signal received by the head. The heads can each include optics 312 that are needed to provide the received LIDAR output signal with the desired optical characteristics. For instance, all or a portion of the heads can include one or more lenses that collimate, focus, or reduce the divergence of the received LIDAR output signal. The heads can be in electrical communication with the electronics 62. The electronics 62 can operate each head 310 so as to steer the LIDAR output signal in the desired direction. For instance, the electronics 62 can operate each head so as to steer the LIDAR output signals toward the same sample region on the field of view as shown in FIG. 13. The sample region is located where there is sufficient overlap between the LIDAR output signals for the LIDAR data in each of the output signals to be representative of the same region of the field of view. A reflecting object 304 is positioned in the sample region. As a result, the LIDAR output signals are reflected back toward the LIDAR chips from the field of view.

Additionally, the electronics 62 can operate each head so as to steer the LIDAR output signals from one sample region in the field of view to another sample region in the field of view. For instance, the electronics 62 can operate each head so as to steer the LIDAR output signals to different sample regions that are different distances from one of both of the LIDAR chips. Accordingly, the sample regions in the field of view can be arranged in one, two, or three dimensions. Suitable heads include, but are not limited to, collimators mounted on motorized stages.

Figure 14:
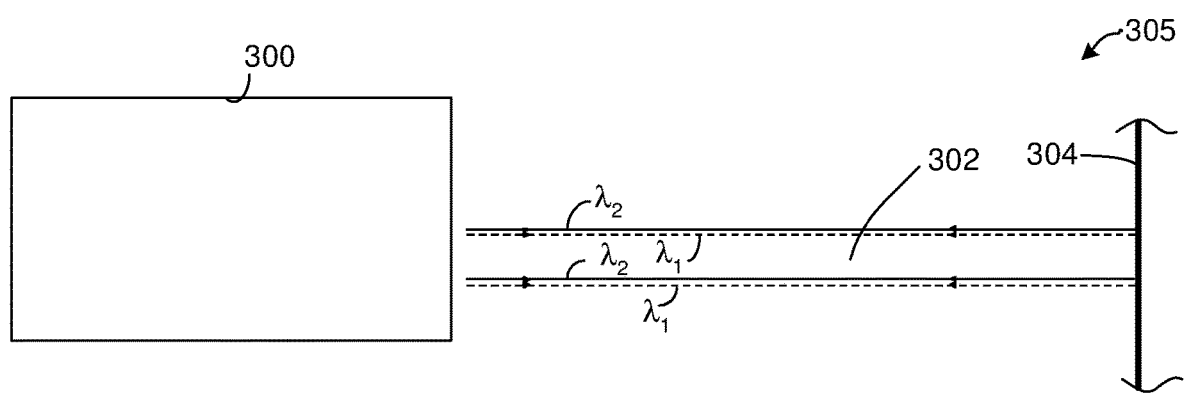
FIG. 14 illustrates a LIDAR chip that outputs multiple LIDAR output signals that are each incident on the same sample region in a field of view and are each at a different wavelength.

The LIDAR systems can be configured to provide wavelength diversity where multiple sample regions in the field of view are each concurrently illuminated by multiple different LIDAR output signals that each has a different wavelength. For instance, FIG. 14 illustrates a LIDAR chip 300 that outputs multiple LIDAR output signals. A first LIDAR output signal is labeled $X_1$ and is illustrated by dashed lines and a second LIDAR output signal is labeled $X_2$ and is illustrated by solid lines. The LIDAR output signals are directed toward the same sample region and signals that are each at a different wavelength (channel). The sample region 302 is located where there is sufficient overlap between the LIDAR output signals for the LIDAR data in each of the output signals to be representative of the same region of the field of view. FIG. 14 shows a reflecting object 304 positioned in the sample region. As a result, the LIDAR output signals are shown being reflected back toward the LIDAR chips from the field of view.

The different LIDAR output signals can be fully or partially overlapping as shown in FIG. 14. However, the different LIDAR output signals can travel away from the LIDAR chip in the same or essentially the same direction. As a result, the different LIDAR output signals can be directed along the same or essentially the same optical pathway between the LIDAR chip and the sample region and accordingly travel along the same optical pathway between the LIDAR chip and a reflecting object. For instance, the LIDAR chip can be constructed according to FIG. 3A through FIG. 4 with an output component 126 constructed according to FIG. 9C and with the splitter 284 and steering waveguides 286 constructed such that there is not a phase differential between LIDAR output signals at the facet of adjacent steering waveguides. In these instance, when the phase tuners 290 are not present, or are present but not operated so as to add a phase differential, LIDAR output signals of different wavelengths can travel to the sample region along the same optical path or along essentially the same optical path. When the LIDAR chip can be constructed according to FIG. 3A through FIG. 4 with an output component 126 constructed according to FIG. 9C and phase tuners 290 are included on the output component 126, the phase tuners 290 can be operated such that there is not a phase differential between output signals at the facet of adjacent steering waveguides. The lack of a phase differential between the LIDAR output signals allows the LIDAR output signals of different wavelengths to travel to the sample region along the same optical path or along essentially the same optical path. As a result, multiple different LIDAR input signals are generated for the same sample region and each of the different LIDAR input signals is associated with a different wavelength. Accordingly, there is an option to generate multiple LIDAR data values for the sample region where each LIDAR data value is associated with a different wavelength.

The LIDAR chip of FIG. 14 can be configured to steer the LIDAR output signal. For instance, the LIDAR chip can be constructed with an output component 126 constructed according to FIG. 9C and/or with an actuator disclosed in the context of FIG. 10. As a result, the electronics 62 can steer the LIDAR output signals from one sample region in the field of view to other sample regions in the field of view.

Figure 15:
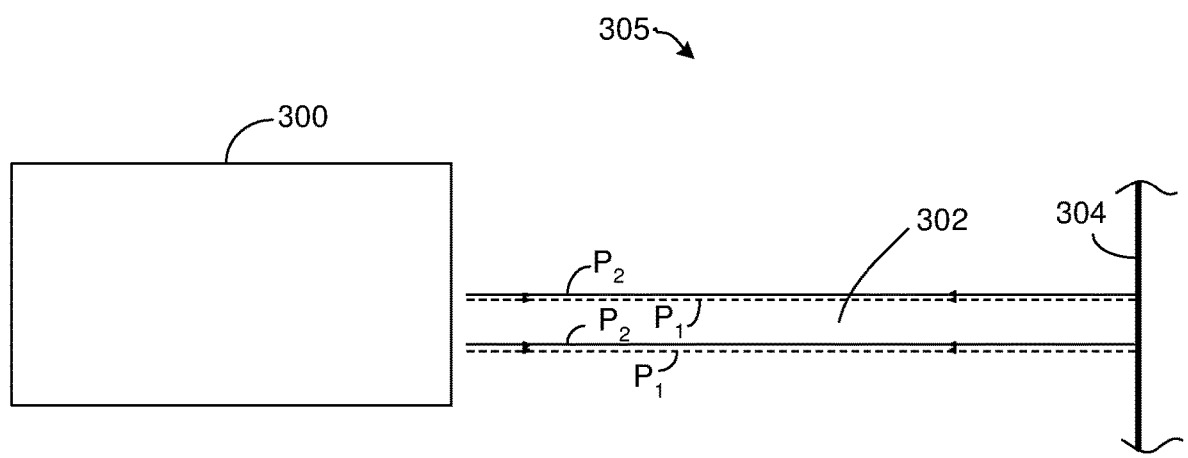
FIG. 15 illustrates a LIDAR chip that outputs multiple LIDAR output signals that are each incident on the same sample region in a field of view and are each at a different wavelength.

The LIDAR systems can be configured to provide polarization diversity where multiple sample regions in the field of view are each concurrently illuminated by multiple different LIDAR output signals that each has a different polarization. For instance, FIG. 15 illustrates a LIDAR chip 300 that outputs multiple LIDAR output signals that are each at a different polarization. A first LIDAR output signal is labeled $P_1$ and is illustrated by dashed lines and a second LIDAR output signal is labeled $P_2$ and is illustrated by solid lines. The first LIDAR output signal $(P_1)$ and the second LIDAR output signal $(P_2)$ can have the same wavelength. The LIDAR output signals are directed toward the same sample region. The sample region is located where there is sufficient overlap between the LIDAR output signals for the LIDAR data in each of the output signals to be representative of the same region of the field of view. FIG. 15 shows a reflecting object 304 positioned in the sample region. As a result, the LIDAR output signals are shown being reflected back toward the LIDAR chip from the field of view.

The different LIDAR output signals can be fully or partially overlapping as shown in FIG. 15. However, the different LIDAR output signals can travel away from the LIDAR chip in the same or essentially the same direction. As a result, the different LIDAR output signals can be directed along the same or essentially the same optical pathway between the LIDAR chip 300 and the sample region and accordingly travel along the same optical pathway between the LIDAR chip and a reflecting object positioned in a sample region. For instance, the LIDAR chip can be constructed according to FIG. 4 with an output component 126 constructed and operated according to FIG. 9C. A LIDAR chip constructed according to FIG. 4 can include a polarization rotator 294 positioned along the utility waveguide. When a light source 110 outputs an outgoing light signal that is polarized, the polarization rotator 294 can change the polarization of the outgoing light signal. For instance, when the outgoing light signal has a first polarization, the polarization rotator 294 can operate on the outgoing light signal so the outgoing light signal output by the polarization rotator 294 has a mixture of light in the first polarization and in a second polarization. As an example, when the outgoing light signal has a first linear polarization, the polarization rotator 294 can operate on the outgoing light signal so the outgoing light signal output by the polarization rotator 294 has a mixture of light in the first linear polarization and in a second linear polarization. In some instances, the polarization rotator 294 is configured output an outgoing light signal where 40-60% of the optical power is in a first linear polarization and 40-60% of the optical power is in a second linear polarization. In this configuration, the first LIDAR output signal and the second LIDAR output signal have the same wavelength, and the first LIDAR output signal has the first linear polarization, and the second LIDAR output signal has the second linear polarization. Since the first LIDAR output signal and the second LIDAR output signal have the same wavelength they can be directed along the same or essentially the same optical pathway between the LIDAR chip and the sample region and accordingly travel along the same optical pathway between the LIDAR chip and a reflecting object positioned in the sample region. As a result, multiple different LIDAR input signals are generated for the same sample region and each of the different LIDAR input signals is associated with a different polarization. Accordingly, there is an option to generate multiple LIDAR data values for the sample region where each LIDAR data value is associated with a different polarization.

As is evident from FIG. 12 through FIG. 15, a series of sample regions in a field of view can each be concurrently illuminated by multiple LIDAR output signals that have an optical diversity selected from a group consisting of angle of incidence diversity, wavelength diversity, and polarization diversity. However, the LIDAR output signals can have more than one optical diversity. For instance, the LIDAR output signals in FIG. 15 can have both different wavelengths and different polarities. As another example, the LIDAR output signals of FIG. 12 and FIG. 13 can have different wavelengths and different angles of incidence. Accordingly, a series of sample regions in a field of view can each be concurrently illuminated by multiple LIDAR output signals that have one or more optical diversities selected from a group consisting of angle of incidence diversity, wavelength diversity, and polarization diversity.

The LIDAR chips of FIG. 15 can be configured to steer the LIDAR output signals. For instance, the LIDAR chip can be constructed with an output component 126 constructed according to FIG. 9C and/or with an actuator disclosed in the context of FIG. 10. As a result, the electronics 62 can steer the LIDAR output signals from one sample region in the field of view to other sample regions in the field of view.

FIG. 12 through FIG. 15 illustrate the different LIDAR output signals as being collimated. However, in many instances, it is desirable for the different LIDAR output signals to have other optical characteristics. For instance, it may be desirable for the LIDAR output signals to be focused. Focusing the LIDAR output signal can provide further performance improvement with regard to speckle when focusing the LIDAR output signal causes the diameter of the LIDAR output signal to be smaller at the reflecting object than when exiting from the LIDAR system. The desired optical characteristics for the LIDAR output signals can be achieved using a variety of different mechanisms. For instance, one or more lenses can be employed to achieve the desired optical characteristics. As an example, a convex lens 314 can be used to collimate the LIDAR output signals as shown in FIG. 12. Alternately, the distance between the lens and the LIDAR chip can be adjusted to focus the LIDAR output signals. When the LIDAR chip includes an output component 126 constructed according to FIG. 9C, the one or more lenses can be employed to achieve the desired optical characteristics. Alternately, when the LIDAR chip includes an output component 126 constructed according to FIG. 9C and includes phase tuners 290, the electronics can operate the phase tuners 290 so as to add collimation or focus to the LIDAR output signals. As a result, the electronics can operate the phase tuners 290 so as to provide the LIDAR output signals with the desired optical characteristics and also with the desired steering direction. When the LIDAR chip includes an output component 126 constructed according to FIG. 9C and does not includes phase tuners 290, the first reference waveguide 210 and the second reference waveguide 208 can be constructed to provide a phase shift between the outputs signals that provides the LIDAR outputs signals with the desired optical characteristics.

As noted above, the different LIDAR output signals are concurrently incident on the same sample region on the field of view. Different LIDAR output signals that are concurrently incident on the same sample region can overlap one another. In some instances, the LIDAR output signals are configured such that if the LIDAR output signals are not intersected by the reflecting object, the LIDAR output signals would overlap one another in a sample region such that the smallest amount that any one LIDAR output signal is overlapped by another LIDAR output signal in the same region is more than 25%, 45%, or 60% and less than or equal to 100% of the spot size of the overlapped LIDAR output signal on the field of view.

As note above, each of the different optical diversities provides an opportunity to use more than one LIDAR output signal to generate LIDAR data for a sample region. Accordingly, in one cycle, the LIDAR system has the ability to generate multiple different LIDAR data that are each associated with a different LIDAR output signal. A LIDAR data processing method can be used to generate the resultant LIDAR data for a sample region during one cycle. The resultant LIDAR data can be the LIDAR data that is treated as the distance and/or radial velocity between the source of the LIDAR output signal and the reflecting object for additional processing by the electronics 62 and/or by other electronics in communication with the electronics 62.

The LIDAR data processing method can generate the resultant LIDAR data from a combination of the different LIDAR data that are generated for a sample region during one cycle. For instance, the LIDAR data processing method can average, perform a weighted average, take a maximum, minimum or median value of the different LIDAR data values that are generated for a sample region during one cycle. An example of a weighted average is an average of the LIDAR data with each LIDAR data weighted by the power of the LIDAR input signals from which the LIDAR data was generated. As an example, multiple radial velocity values generate for a sample region during the same cycle can be averaged to generate the final radial velocity value. Alternately, the LIDAR data processing method can identify particular LIDAR data to serve as the resultant LIDAR data. For instance, the median LIDAR data value can be identified to serve as the resultant LIDAR data, or one or more selection criterion can be used to identify the LIDAR data. Alternately, one or more selection criterion can be used to identify particular LIDAR data and the identified LIDAR data can be combined to generate the resultant LIDAR data. For instance, the identified LIDAR data can be averaged. As an example, multiple radial distance values that are identified can be averaged to generate the final radial velocity value.

An example of the selection criterion takes into consideration data that indicate the power of the LIDAR input signals that result from the LIDAR output signals that illuminate a sample region. A variety of different indications of this power level are available from the LIDAR chips. For instance, the power of the output from the balanced detectors, the power of the output from a light sensor that replaces the balanced detectors, the power of the signal(s) that have beating between the comparative signal and the reference signal, and the power of the signal(s) that have beating between a portion of the comparative signal and a portion of the reference signal can all indicate the power level of a LIDAR input signal. The LIDAR data generated from the most powerful LIDAR input signal can be selected to serve as the resultant LIDAR data. Alternately, the one or more LIDAR input signals that have a power level above a power threshold can be identified as the LIDAR input signals from which the resultant LIDAR data is generated. As noted above, the identified LIDAR data can be combined to generate the resultant LIDAR data. For instance, the identified LIDAR data can be averaged. As an example, multiple radial distance values that are identified can be averaged to generate the final radial velocity value.

A variety of platforms can be employed for a chip that includes the component assemblies. A suitable platform includes, but is not limited to, a silicon-on-insulator wafer. One or more of the above components and/or portions of the above components can be integral with the chip or can be placed on the chip with technologies such as flip-chip bonding technologies. For instance, a light source 110 and/or a light sub-source 111 can include a gain element and one or more other components such as waveguides. The waveguide can be integral with the chip and the gain element can be a component that is separate from the chip but attached to the chip with a flip-chip bonding. Alternately, the above LIDAR system can be constructed with discrete components. For instance, all or a portion of the waveguides can be optical fibers connecting discrete components. Alternately, one or more portions of the LIDAR system can be integrated on a chip while other portions are discrete components. For instance, the utility waveguide 16 can be or include an optical fiber that provides optical communication between a light source 110 and an optical chip that includes the remainder of the LIDAR system.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. A LIDAR system, comprising:
   one or more LIDAR chips that generate multiple LIDAR output signals; and
   electronics that operate the one or more LIDAR chips such that the LIDAR output signals are concurrently directed to the same sample region in a field of view and overlap at the sample region, the LIDAR output signals having one or more optical diversities selected from a group consisting of wavelength diversity, polarization diversity, and diversity of an angle of incidence of the LIDAR output signal relative to the sample region,
   the electronics generating multiple different LIDAR data results for the sample region,
      each of the LIDAR data results including the distance and/or radial velocity between the LIDAR system and the sample region, and
      each of the different LIDAR data results being associated with a different one of the LIDAR output signals in that the electronics use light from the LIDAR output signal associated with the LIDAR data result to generate the LIDAR data result.

2. The LIDAR system of claim 1, wherein the one or more LIDAR chips is one LIDAR chip that generates the multiple LIDAR output signals.

3. The LIDAR system of claim 1, wherein the one or more LIDAR chips is multiple LIDAR chips that generate the multiple LIDAR output signals.

4. The LIDAR system of claim 1, wherein the optical diversity is wavelength diversity.

5. The LIDAR system of claim 1, wherein the optical diversity is polarization diversity.

6. The LIDAR system of claim 1, wherein the optical diversity is diversity of the angle of incidence.

7. The LIDAR system of claim 1, wherein the sample region is one of multiple sample regions in the field of view, the electronics being configured to sequentially direct the LIDAR output signals to a series of the sample regions such that the LIDAR output signals are concurrently directed to each of the sample regions and overlap at each of the sample regions.

8. The LIDAR system of claim 1, wherein the LIDAR output signals have more than one of the optical diversities.

9. The LIDAR system of claim 1, wherein the LIDAR output signals each travels to a focus as they travel away from the LIDAR system.

10. The LIDAR system of claim 1, wherein the LIDAR output signals travel on the same optical pathway between the LIDAR chip and the sample region.

11. A method of operating a LIDAR system, comprising:
   generating multiple LIDAR output signals;
   concurrently directing the LIDAR output signals to a sample region in a field of view such that the LIDAR output signals have one or more optical diversities selected from a group consisting of wavelength diversity, polarization diversity, and diversity of an angle of incidence of the LIDAR output signal relative to the sample region; and
   generating multiple different LIDAR data results for the sample region,
      each of the LIDAR data results including the distance and/or radial velocity between the LIDAR system and the sample region, and
      each of the different LIDAR data results being associated with a different one of the LIDAR output signals in that the electronics use light from the LIDAR output signal associated with the LIDAR data result to generate the LIDAR data result.

12. The method of claim 11, wherein the LIDAR output signals exit from a LIDAR chip.

13. The method of claim 11, wherein the LIDAR output signals exit from different LIDAR chips.

14. The method of claim 11, wherein the optical diversity is wavelength diversity.

15. The method of claim 11, wherein the optical diversity is polarization diversity.

16. The method of claim 11, wherein the optical diversity is diversity of the angle of incidence.

17. The method of claim 11, wherein the sample region is one of multiple sample regions in a field of view and further comprising:
- sequentially directing the LIDAR output signals to a series of the sample regions such that the LIDAR output signals are concurrently directed to multiple sample regions in the series and overlap at each of the sample regions.

18. The method of claim 11, wherein the LIDAR output signals have more than one of the optical diversities.

19. The method of claim 11, wherein the LIDAR output signals each travel to a focus as they travel to the sample region.

20. The method of claim 11, wherein LIDAR output signals exit from a LIDAR chip and the LIDAR output signals travel on the same optical pathway between the LIDAR chip and the sample region.

* * * * *